US011599098B2

(12) United States Patent
Wentz et al.

(10) Patent No.: US 11,599,098 B2
(45) Date of Patent: Mar. 7, 2023

(54) APPARATUS AND METHODS FOR TESTING CIRCUIT ELEMENTS AT ONE OR MORE MANUFACTURING STAGES

(71) Applicant: Ares Technologies, Inc., Boston, MA (US)

(72) Inventors: Christian T Wentz, Providence, RI (US); Ilia Lebedev, Cambridge, MA (US)

(73) Assignee: Ares Technologies, Inc., Boston, MA (US)

( * ) Notice: Subject to any disclaimer, the term of this patent is extended or adjusted under 35 U.S.C. 154(b) by 302 days.

(21) Appl. No.: 16/870,080

(22) Filed: May 8, 2020

(65) Prior Publication Data

US 2020/0356085 A1 Nov. 12, 2020

Related U.S. Application Data

(60) Provisional application No. 62/844,787, filed on May 8, 2019.

(51) Int. Cl.

| | |
|---|---|
| ***G06F 21/71*** | (2013.01) |
| ***H04L 9/32*** | (2006.01) |
| ***G05B 19/418*** | (2006.01) |
| ***G06F 30/398*** | (2020.01) |
| ***G01R 31/317*** | (2006.01) |
| ***G01R 31/3183*** | (2006.01) |

(Continued)

(52) U.S. Cl.

CPC ....... *G05B 19/41875* (2013.01); *G01R 31/26* (2013.01); *G01R 31/317* (2013.01); *G01R 31/318342* (2013.01); *G06F 21/71* (2013.01); *G06F 30/398* (2020.01); *H04L 9/3236* (2013.01); *G06F 2119/18* (2020.01)

(58) Field of Classification Search

None

See application file for complete search history.

(56) References Cited

U.S. PATENT DOCUMENTS

| | | | |
|---|---|---|---|
| 4,497,056 | A | 1/1985 | Sugamori |
| 5,404,110 | A | 4/1995 | Golladay |
| 5,789,933 | A | 8/1998 | Brown et al. |

(Continued)

OTHER PUBLICATIONS

Li, et al., "Integrated Design Validation: Combining Simulation and Formal Verification for Digital Integrated Circuits", Apr. 2006, Systemics, Cybernetics and Informatics, vol. 4, No. 2, pp. 22-30. (Year: 2006).*

(Continued)

*Primary Examiner* — Nelson S. Giddins

(74) *Attorney, Agent, or Firm* — Caldwell Intellectual Property Law

(57) ABSTRACT

A method for testing circuit elements at one or more manufacturing stages comprising receiving, at a circuit verifier a fingerprint of at least a circuit element to be manufactured, wherein the fingerprint further comprises at least an expected output corresponding to at least a test input, transmitting, from the circuit verifier the at least a test input to the at least a circuit element, receiving, at the circuit verifier at least a test output from the at least a circuit element, and comparing, by the circuit verifier the at least a test output to the at least an expected output of the fingerprint of the at least a circuit element.

20 Claims, 7 Drawing Sheets

100
Circuit Verifier
104
Secure Computing Module
108
TPM 112
PUF 116
Secure Processor 120
Data Output Port 132
Data Input Port 128
Circuit Element
124
Power supply Port 136

(51) Int. Cl.
*G01R 31/26* (2020.01)
*G06F 119/18* (2020.01)

(56) References Cited

U.S. PATENT DOCUMENTS

| | | | | |
|---|---|---|---|---|
| 6,163,862 | A | 12/2000 | Adams et al. | |
| 9,442,148 | B2 | 9/2016 | Chow | |
| 9,513,320 | B2 | 12/2016 | Whisenand et al. | |
| 10,145,894 | B1 | 12/2018 | Tangyunyong et al. | |
| 10,228,419 | B2 | 3/2019 | Song | |
| 10,310,008 | B2 | 6/2019 | Federley et al. | |
| 10,312,858 | B2 | 6/2019 | Kouno et al. | |
| 2016/0308889 | A1 | 10/2016 | Justin et al. | |
| 2018/0238961 | A1 | 8/2018 | Rupper et al. | |
| 2019/0140852 | A1* | 5/2019 | Kreft | G06F 21/71 |
| 2019/0154751 | A1 | 5/2019 | Eck et al. | |
| 2019/0318135 | A1 | 10/2019 | Schat | |

OTHER PUBLICATIONS

International Search Report; PCT/US21/31527; dated Aug. 16, 2021; By: Authorized Officer: Kari Rodriquez.

Title: Integrated Design Validation: Combining Simulation and Formal Verification for Digital Integrated Circuits; By: Mitchell A. Thornton; Date: Jan. 2006.

* cited by examiner

APPARATUS AND METHODS FOR TESTING CIRCUIT ELEMENTS AT ONE OR MORE MANUFACTURING STAGES

CROSS-REFERENCE TO RELATED APPLICATIONS

This application claims the benefit of priority of U.S. Provisional Patent Application Ser. No. 62/844,787, filed on May 8, 2019, and titled "APPARATUS AND METHODS FOR TESTING CIRCUIT ELEMENTS AT ONE OR MORE MANUFACTURING STAGES," which is incorporated by reference herein in its entirety.

FIELD OF THE INVENTION

The present invention generally relates to the field of computer security and component authentication. In particular, the present invention is directed to an apparatus and methods for testing circuit elements at one or more manufacturing stages.

BACKGROUND

Manufacturing components requires honesty in the design and production process so as to provide reliability on which users of manufactured components depend. Breaches of security in the production process can occur, whereby manufactured components can become corrupted by malicious actors, including people working at manufacturers or other participants in the supply chain. As a result, security of hardware, and systems supported by the hardware, can be compromised in ways that are difficult to detect or remedy.

SUMMARY OF THE DISCLOSURE

In an aspect, a method of testing circuit elements at one or more manufacturing stages, includes receiving, at a circuit verifier, from at least a manufacturer of at least a circuit element, an attested fingerprint the circuit element, wherein the fingerprint further includes at least an expected output corresponding to at least a test input. The method includes transmitting, from the circuit verifier, the at least a test input to the circuit element. The method includes receiving, at the circuit verifier, at least a test output from the at least a circuit element. The method includes comparing, by the circuit verifier, the at least a test output to the at least an expected output of the fingerprint of the at least a circuit element. The method includes generating, by the circuit verifier, an attestation of a result of the comparing.

In another aspect, an apparatus for testing circuit elements at one or more manufacturing stages, includes a circuit verifier communicatively coupled to a plurality of circuit elements, the circuit verifier designed and configured to receive, from at least a manufacturer of at least a circuit element, an attested fingerprint the circuit element, wherein the fingerprint further comprises at least an expected output corresponding to at least a test input, transmitting the at least a test input to the at least a circuit element, receive at least a test output from the circuit element, comparing the at least a test output to the at least an expected output of the fingerprint of the at least a circuit element, and generate an attestation of a result of the comparing.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
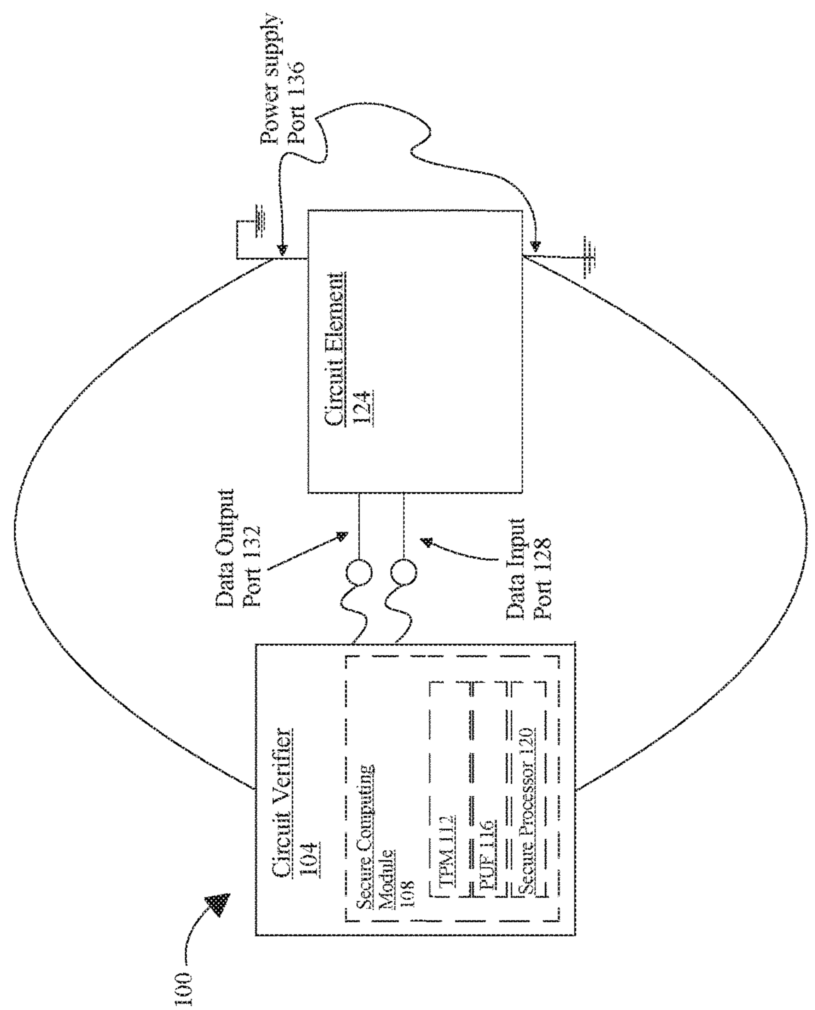
FIG. 1 is an exemplary embodiment of an apparatus for testing circuit elements at one or more manufacturing stages.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to "checkpoints" that test manufactured components such as circuit elements throughout a production process to ensure component authenticity. Circuit elements may be tested by comparing a test output of a manufactured component to a known fingerprint or expected output of a circuit element. Test outputs may be generated by transmitting a test input to a circuit element and receiving a test output in response. Outputs that deviate from known fingerprint may suggest corruption of the manufactured component. Outputs that may be tested at one or more manufacturing stages include data output, power consumption, current consumption, and/or capacitance readings. Additional outputs may be digital response to input sequences, challenge/response pairs, and the like. Outputs may be compared to known fingerprints, and to other test outputs generated at other manufacturing stages.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Referring now to FIG. 1, an exemplary embodiment of an apparatus 100 for testing circuit elements at one or more manufacturing stages is illustrated. Apparatus 100 includes a circuit verifier 104. Circuit verifier 104 may include any computing device as described in this disclosure. Circuit verifier 104 may include a secure computing module 108. As used herein, a secure computing module 108 is a hardware element configured to perform one or more secured operations beyond the control of other circuit elements or software, whether incorporated with the secure computing module 108 in a circuit or computing device, or a part of an extrinsic computing device. As a result, at least one secured operation performed by secure computing module 108 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 108 and/or a system or computing device incorporating secure computing module 108 based on the above-described set of assumptions. As a non-limiting, example, a secure computing module 108 designed to produce an expected result despite all software-only attacks may give rise to a first confidence level, whereas another secure computing module 108 designed to produce its expected result in the face of all software or hardware attacks may give rise to a second confidence level; the second confidence level may be higher, owing to the reduced probability that the second secure computing module 108 would be compromised.

Still viewing FIG. 1, secure computing module 108 may include a trusted platform module (TPM 112). In an embodiment, a TPM 112 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM 112 may have any suitable elements of digital or analog circuitry usable to perform one or more processes as described herein, including without limitation processes used to determine confidence levels and/or authenticate digitally signed assertions as described below. TPM 112 may have memory and/or other logic and/or a processor in its own right which may be in a non-limiting example a crypto-processor. TPM 112 may have a hard-coded process for signing a digital signature, which may be performed using a private key, which is associated with a public key. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices. Secure computing module 108 may include at least PUF 116. PUF 116 may be implemented by various means and/or protocols as described below in reference to FIG. 3.

Continuing to view FIG. 1, in general a modulator of a signal may be configured to utilize a source of randomness as driver of the modulator, the output of said modulator being the input to a key derivation function, or the output is the key or secret itself for the target device. The output is programmed or directly patterned onto/into the target device as a device specific secret or key pair unique for each device. As a non-limiting and illustrative example, a TRNG based on either a digital device or analog source, e.g. the filtered output of a Zener diode with offset voltage zeroed, is sampled by an element; element may include any circuit element and/or module as described in this disclosure. Sample may be processed to ensure output is within appropriate bounds to be usable, e.g. if the signal is analog in nature it may be binned into discrete values such that the outputs are distinguishable by a circuit of given bit precision. If the signal is analog or digital in nature it may be binned in time or frequency such that the outputs are distinguishable by a circuit of a given clock accuracy. Sample may be compressed, elongated, phase adjusted, binned or otherwise processed to meet the requirements of the target device; that sample, once processed, may be used to modulate an optical source, e.g. a lithographic patterning device (e.g. a laser source or e-beam,) via, e.g., an acousto-optical modulator (AOM). In such an example, when the lithographic patterning device is configured to write device-specific secret features onto the target device in a constrained area or series of areas, the control of the lithographic patterning device may be configured to use the modulator. In an example of maskless lithographic process, a target and/or receiving device may read this patterned area as digital inputs (e.g. an N-dimensional space of inputs read in some particular repeatable pattern, e.g. sampling of rows and columns in a particular one or more sequences; as analog inputs, e.g. by sampling the response of the region of material to a given challenge (e.g. an input/output relationship utilizing parameters of voltage, current, phase angle, time delay, etc.), as electromagnetic, acoustic, thermal or other parameters (e.g. the one or more regions processed may be sampled via optical source and resulting speckle pattern captured via any number of means), the resulting pattern being processed to yield a digital device specific secret or seed to a key derivation function, hash function or the like, yielding at least a device specific secret or key pair.

Still referring to FIG. 1, construction of TPM 112 and/or other circuits containing secret, device-specific, or other data and/or processes as disclosed in this disclosure may be generated and/or modified using any number of means to modulate a programming sequence to be written into one-time programmable fuses, EPROM, poly fuses, or other read-only memory device; a secret may be written directly or via encrypted means from a secure hardware element to a target device and/or receiving device. For example, one time use cryptographic keys may be exchanged to allow the target device to decrypt the secret and store it securely. Methods above may be used in combination with other techniques described in this disclosure and/or elsewhere using, for instance, an obfuscated storage approach, e.g., the device-specific secret may in turn be stored encrypted.

Still referring to FIG. 1, secure computing module 108 and/or any other circuit and/or circuit element may be created using and/or configured to implement obfuscated and/or oblivious key fabrication. In general a modulator of a signal may be configured to utilize a source of randomness as driver of modulation of an input to a key derivation function, an output of which may be programmed or directly patterned onto/into a device, circuit, sub-circuit, circuit element, and/or module including without limitation a secure computing module 108 and/or any component thereof as a device-specific secret or key pair unique for each such device. As a non-limiting example, a TRNG, such as without limitation a digital device and/or a filtered output of a Zener diode, may sampled by an element; that sample may be used to modulate an optical source. For example, and without limitation, a seed value for a given KDF, hash function or the like may be derived from a randomness driven modulator—such source of randomness may be any of the types described in this disclosure. A secret may be written directly via photolithography, e.g. maskless e-beam lithography, programmed onto an EPROM directly or via encrypted channel from a secure hardware element to a target and/or receiving device, circuit, circuit element, sub-circuit, module, or the like.

Continuing to refer to FIG. 1, secure computing module 108 may implement one or more secure memory storage protocols. One or more secure memory storage protocols may be protocols designed to prevent unauthorized access to memory and/or to protect secure computing module 108 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 108. For instance, and without limitation, it may be infeasible to physically probe or access memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 108 may incorporate a memory controller located within the trusted computing boundary to encrypt and authenticate by a secret key memory element such as without limitation memory page tables and/or memory pages accessible by other software elements, such as an operating system. Various techniques, processes, means or elements may be used to implement the above-described secure memory protocols. For instance, secure computing module 108 may use hardware-enabled access control to protect memory access; hardware access control may, as a non-limiting example, be performed by tagging each memory entry with a "container identifier" corresponding to a page, file, or other grouping of memory, enabling secure computing module 108 to determine whether tampering has occurred.

Secure computing module 108 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 108 may operate using one or more dedicated memory objects, registers, or storage elements; as a non-limiting example, secure computing module 108 may operate with dedicated cache lines not available to other processes or circuits, preventing, e.g., stack or buffer overrun attacks to corrupt or steal data. Dedicated memory elements may be wired only to secure computing module 108; access to dedicated memory elements may be rendered impossible except by way of secure computing module 108. Secure computing module 108 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 108 may utilize oblivious random-access memory (RAM) wherein memory access patterns are obfuscated to prevent detection of memory access patterns by outside observers attempting to deduce execution details regarding processes performed using secure computing module 108. Secure computing module 108 and/or device incorporating secure computing module 108 may incorporate a trusted non-volatile storage device that provides some means of verification of secure storage capability and other properties. Memory protocols as described above may be used to implement methods of attested storage and the chain of trust beginning at PUF 116 level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 108.

Still referring to FIG. 1, secure computing module 108 may include a secure processor 120. Secure processor 120 may be a processor as described in this disclosure. Secure processor 120 may operate autonomously from other processors and/or an operating system operating on at least a cryptographic evaluator; for instance, secure processor 120 may store entries in temporary or long-term memory in encrypted form, where decryption is impossible without private keys not available to devices, circuits or software besides secure processor 120. Encryption may likewise be impossible without private keys available only to secure processor 120. Secure processor 120 may also digitally sign memory entries using, for instance, a private key available only to secure processor 120. Keys available only to secure processor 120 may include keys directly encoded in hardware of the secure processor 120; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor 120. Secure processor 120 may be constructed, similarly to TPM 112, to frustrate alteration and/or probing to discover and/or alter private keys. Private keys may be demonstrable as uniquely associated with secure processor 120 by use of PUF 116 as described above; secure processor 120 may include, for instance, a TPM 112 as described above. Alternatively or additionally, a certificate authority as described above, which may be a manufacturer of secure processor 120, may verify that one or more public keys are associated uniquely with secure processor 120 according to any protocol suitable for digital certificates. Alternatively or additionally, a certificate authority may verify that a device possesses a secret associated with a public key or plurality of public keys. Protocols may include but are not limited to sigma proofs, accumulator-based methods, group signatures, mercurial signatures and/or other delegable credentials, other anonymity preserving or unmaskable anonymity preserving signatures such as CL signatures, and the like.

In an exemplary embodiment, and with continued reference to FIG. 1, a manufacturing process may include methods of incorporating one or more device-specific secrets into cryptographic keys based on inductance, resistance and/or capacitance parameters measured at various points in time along the manufacturing process to fingerprint a specific combination of component parts in a configuration, such that removal of a component, modification of a component, or tampering with a component changes the one or more device-specific secrets in such a way that elements so manufactured may be queried for proof of integrity or lack thereof. An element and/or device constructed as described in this disclosure may incorporate PUFs, as described in further detail below, or other device-specific secrets as described in this disclosure in conjunction with certain "personalization" data, for instance and without limitation added using one-time programmable fuses or electronically programmable read-only memories (EPROMs) after integrated circuit (IC) manufacturing and packaging into a larger assembly to establish device-specific sequences that uniquely identify said device. A purpose of personalization data may be at least in part to add further unique information to a device such that an original equipment manufacturer (OEM) or other entity may have protections that distinguish a piece of equipment the OEM or other entity manufactures incorporating such an integrated circuit from other devices incorporating the same integrated circuit, to protect against downstream supply chain attacks (e.g. key spoofing, equipment cloning), or the like. At any point in the manufacturing chain it may be desirable to incorporate device-specific features or manufacturing stage specific features into the set of secrets from which keys are derived such that were the device to be compromised via physical key extraction, e.g. "de-capping" in which the lid of the die package or similar feature is removed and the bare integrated circuit is exposed for inspection, or for harvesting for integration into another product, etc. it would be apparent to the user or a verified tester in that the device specific secret would change by the removal or modification process.

In an embodiment, secure computing module 108 and/or a computing device incorporating secure computing module 108 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 108 and/or computing device incorporating secure computing module 108 may append a cryptographic signature based upon any private key that may be associated with secure computing module 108 as described herein. Secure computing module 108 and/or computing device incorporating secure computing module 108 may operate a security reset of working memory prior to load of data for trusted computation; for instance, the secure computing module 108 and/or computing device incorporating secure computing module 108 may append a hash of the memory to cryptographic hash of system state following reset and prior to loading data. Secure computing module 108 and/or computing device incorporating secure computing module 108 may append its authentication signature of memory page tables and/or memory tables. Upon completion of the trusted computation, which may include execution of program code of system state, secure computing module 108 and/or computing device incorporating secure computing module 108 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 108. Secure computing module 108 and/or computing device incorporating secure computing module 108 may include a system to compute one or more hash trees of cryptographic hash of the computation, system state, and/or outputs; secure computing module 108 and/or computing device incorporating secure computing module 108 may store the one or more hash trees within the trusted computation boundary. Alternatively or additionally, such one or more hash trees may be encrypted and stored in untrusted memory. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination. Attested computing may be performed, without limitation, as described in U.S. Nonprovisional application Ser. No. 16/682,371, filed on Nov. 13, 2019, and entitled "METHODS AND SYSTEMS FOR ANONYMOUS HARDWARE ATTESTATION," the entirety of which is incorporated by reference herein.

Still referring to FIG. 1, examples of a secure computing modules 108 may include, without limitation, TPM 112 as described above. The secure computing module 108 may include TPM 112 combined with a boot-measuring protocol using hash trees, Merkle trees, or the like to measure boot entries to create an "attested boot," additionally or separately from the attested computation description described above. A secure computing module 108 may include a trusted execution technology (TXT) module combining a TPM 112 with establishment of a secure container at run-time; secure container may be isolated from a software stack and OS of at least the circuit verifier 104 and/or use TPM 112 to measure and attest to secure container prior to launch. Secure computing module 108 may implement a trusted enclave, also known as a trusted execution environment (TEE) or secure enclave. In an embodiment, a trusted enclave may be a portion of a computing device that is isolated from the main processor of the computing device. Isolation may be achieved using elements of secure computing module 108 as described above, including isolation of memory. Isolation of memory may be achieved through any process or architecture as described above for secure memory, including encryption using a cryptographic system a decryption and/or encryption key to which a secure processor 120 or TPM has access, but to which a CPU or other main processor, as well as input/output devices or connections, does not and/or use of dedicated cache lines or the like to physically separate memory accessible to secure computing module 108 from CPU and/or input/output devices or connections. Inputs and outputs to and from trusted enclave may be restricted and controlled tightly by a secure processor 120 and/or TPM as described above, including software security monitors. Trusted enclaves may be considered protected memory primitives in which the program stack and stack pointer are reset prior to loading of code into the enclave and flushed prior to exiting trusted enclave operation. In general, trusted enclaves may be defined as hardware or software primitives that prohibit unauthorized access to memory segments during execution of sensitive code, including via access to processor caches. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, Calif. The Sanctum architecture and Ascend secure infrastructure from MIT, Ghostrider secure infrastructure, ARM TrustZone, Trusted Little Kernel (TLK) as promulgated by Nvidia Corporation of Santa Clara, Calif., and Secure Encrypted Virtualization (SEV) as promulgated by Advanced Micro Devices, Inc. of Santa Clara, Calif., and/or any other suitable architecture. Persons skilled in the art, upon reviewing the entirety of this disclosure, will be aware of various additional or alternative trusted computing processes that may be used to implement secure computing module 108, TEE, or trusted enclaves as disclosed herein. Apparatus 100 may incorporate or communicate with a certificate authority.

Still referring to FIG. 1, any computing device described in this disclosure may be configured to generate digital signatures. A digital signature as used herein is an application of a secure proof of a secret possessed by a particular device and/or user thereof to an element or lot of data, or to a verifiable mathematical representation of the element or lot of data, which may include a cryptographic hash as described above. A secure proof, as used herein, is a protocol whereby an output is generated that demonstrates possession of a secret, such as module-specific secret, without demonstrating the entirety of the module-specific secret; in other words, a secure proof by itself, is insufficient to reconstruct the entire module-specific secret, enabling the production of at least another secure proof using at least a module-specific secret. Where at least a module-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a module-specific secret, for instance as used in a single challenge-response exchange.

With continued reference to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and still referring to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Further referring to FIG. 1, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, and still referring to FIG. 1, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a module-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Continuing to refer to FIG. 1, digital signature may include, without limitation, an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In an embodiment, and with further reference to FIG. 1, a digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as described in Nonprovisional application Ser. No. 16/682,809, filed on Nov. 13, 2019, and entitled "METHODS AND SYSTEMS FOR IMPLEMENTING AN ANONYMIZED ATTESTATION CHAIN," the entirety of which is incorporated herein by reference.

Still referring to FIG. 1, digital signatures may be generated using a secure computing module 108. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, at least a remote device and/or secure computing module 108 may convert immediate output from PUF

116 into key in the form of a binary number. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Extraction may include extraction of a symmetric key; for instance, at least a remote device and/or secure computing module 108 may extract one or more random numbers based on a PUF 116 output to create a symmetric key as described above. Alternatively or additionally, extraction may include extraction of a private key of a public key cryptographic system.

Still referring to FIG. 1, key extraction may include use of a number output by a PUF 116 or other circuit to generate a public and private key pair. For instance, such a number output may be used as a seed in an elliptic curve cryptographic system. In a non-limiting example, output may include a random number generated within a desired interval, which may be achieved, for instance, by setting the number of output bits to be provided from a PUF 116; steps along a chosen elliptic curve may then be performed using random number to generate a public key. Initial point on elliptic curve and elliptic curve may be selected using an additional random numbers, which may be generated using any suitable method; random numbers associated with curves having known vulnerabilities may be discarded, according to mathematical descriptors or other characteristics of such vulnerabilities as stored in memory of or accessible to at least a remote device and/or secure computing module 108. Persons skilled in the art, upon reading the entirety of this disclosure, will be aware of various ways in which a random number may be used to generate a private and public key pair consistently with this disclosure.

Still viewing FIG. 1, Key extraction may utilize a numerical output from a PUF 116 or other element of secure computing module 108 to generate an RSA private key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 116 and/or elements of secure computing module 108 may generate one or more random numbers, for instance by using one or more PUFs as described above; any suitable algorithm may be used for generating a prime from a random number to produce pairs of primes usable as RSA factors. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Helman or ElGamal that are based on the discrete logarithm problem.

Continuing to view FIG. 1, digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. Secure computing module 108 may act as a "first signer" of a digital signature, signing with a private key produced from a secret generator as described above. In an embodiment secure computing module 108 signs an element of data using the private key. A second signer, which may be secure computing module 108 and/or an additional element coupled thereto, may previously or subsequently sign the element of data or another element linked to the element previously signed; alternatively or additionally, second signer may use information or signature elements provided by secure computing module 108 to perform a digital signature. This process may, for instance, enable generation of novel secret keys using additional circuitry, to demonstrate, for instance, timeliness of execution and frustrate delay-based attacks. DAA may perform digital signature using a zero-knowledge proof, for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof.

Continuing to refer to FIG. 1, circuit verifier 104 may be a trusted device which may include secure hardware registered with a manufacturer or other trusted entity. A manufacturer may have a history of attested computing processes. A manufacturer may attest to or have a history of utilizing physically secured fabrication facilities. Circuit verifier 104 may have been subjected to testing as in this process. Circuit verifier 104 may have been manufactured at a facility that may have strict protocols or monitoring in place. Circuit verifier 104 may be part of a batch of circuit verifiers being manufactured and as such each circuit verifier 104 may be individually tested.

With continued reference to FIG. 1, circuit verifier 104 may be configured to determine if a circuit element has been altered at one or more stages of the manufacturing process. Circuit verifier 104 may engage in a random audit of at least a circuit element at one or more stages in the manufacturing process. A random audit may include circuit verifier 104 randomly selecting at least a circuit element from a manufacturing stage to be tested. Random audit may also include at least a circuit element being randomly assigned to circuit verifier 104 at one or more manufacturing stages. Random audit may include a user who may receive a random selection of at least a circuit element or lot of circuit elements to test, and who may then hook them up to the at least a circuit verifier 104. In an embodiment, additional devices and/or machinery may be involved. In an embodiment, at least a circuit verifier 104 may be randomly placed at different stages of the manufacturing process. Circuit verifier 104 may be electrically connected to any component, module, device, and/or circuit included in apparatus 100. Electrical connection may be performed via a bus or other facility for intercommunication between elements of an apparatus, as describe in further detail below in reference to FIG. 5. Electrical connection may be performed using connectors such as contacting probes with one or more circuit branches or nodes plugging in circuit verifier 104 and/or the at least a circuit element. Electrical connection may be performed using a terminal that connects two or more wires to a single connection point. Connectors may include terminal blocks which may connect individual electrical wires without a splice or physically joining the ends. Posts may also include a type of connector used that screws or clamps bare wire to a post. Posts may include a banana connector plug. Electrical connection may also include insulation displacement connectors which may press the insulated wire and cut through insulation to contact a conductor within. Plug and socket connectors may also be used. Plug and socket connectors may include a male plug such as pin contacts and a female receptacle such as a socket contacts. A male plug may be a moveable connector and may have one or more pins or prongs inserted into openings in the female receptacle. Additional electrical connectors may include component and device connectors, blade connectors, and/or ring and spade terminals. Commonly used connectors may include without limitation 8P8C connectors, D-subminiature connectors, USB connectors, power connectors, radio frequency connectors, DC connectors, hybrid connectors, banana connectors, crown spring connectors, barrier strip/spade lug, crimp connectors, alligator/crocodile clips, screw terminals, phone connectors, pogo pin connectors, tee connectors, audio and video connectors, computer connectors, and/or board to board connectors. Such connectors may utilize inductive, capacitive, optical, or other types of transmitters and/or detectors.

With continued reference to FIG. 1, apparatus 100 is electrically connected to at least a circuit element 124. At least a circuit element 124 may include electrical components of a circuit which may include passive and active components, including without limitation resistors, capacitors, inductors, switches or relays, voltage sources, and the like. A capacitor, as used herein, is a passive two-terminal electrical component that stores potential energy in an electric field and is designed to add capacitance to a circuit. A capacitor typically contains at least two electrical conductors such as metallic plates or surfaces separated by a dielectric medium. A conductor may be a foil, thin film, sintered bead of metal, or an electrolyte. The nonconducting dielectric acts to increase the capacitor's charge capacity. Dielectrics include glass, ceramic, plastic film, paper, mica, and oxide layers. Capacitance is the ratio of the electric charge on each conductor to the potential difference between them. Electrical components may include one or more semiconductor components, such as diodes, transistors, and the like, consisting of one or more semiconductor materials, such as without limitation silicon, processed with dopants, oxidization, and ohmic connection to conducting elements such as metal leads. Some components may be fabricated separately and/or acquired as separate units and then combined with each other or with other portions of circuits to form circuits. Fabrication may depend on the nature of a component; for instance, and without limitation, fabrication of resistors may include forming a portion of a material having a known resistivity in a length and cross-sectional volume producing a desired degree of resistance, an inductor may be formed by performing a prescribed number of wire winding about a core, a capacitor may be formed by sandwiching a dielectric material between two conducting plates, and the like. Fabrication of semiconductors may follow essentially the same general process in separate and integrated components as set forth in further detail below; indeed, individual semiconductors may be grown and formed in lots using integrated circuit construction methodologies for doping, oxidization, and the like, and then cut into separate components afterwards. Circuit verifier 104 may be connected to at least a circuit element 124 via one or more ports. One or more ports may include a data port. A data port may include a communication interface through which information transfers in or out, including serial, parallel, frequency and time multiplexed types of communication links. A data port may include interfaces such as Ethernet, FireWire, universal serial bus (USB), Thunderbolt, Lightning, EPIB bus, or any data port achieving similar functionality. A data port may include serial port. Circuit verifier 104 may be electrically connected to a data port.

Continuing to refer to FIG. 1, one or more ports may include a power supply port 136; a power supply port 136 may include a location on at least a circuit element 124 where electrical power is provided to at least a circuit element 124. For instance, a power supply port 136 may include a voltage source used to provide threshold voltages for one or more logic circuit elements in a digital circuit, a voltage source for an operational amplifier, or the like. A voltage source may include a device that provides a voltage. As an illustrative example, an ideal direct-current voltage source may provide a precise voltage level under all electrical circumstances; a real-world direct-current voltage source may provide a voltage that remains within an applicable tolerance of a target voltage over a given range of circumstances, which may include circumstances consistent with typical operation of the voltage source. A voltage source may include a battery or generator and may provide a potential difference in voltage between two points within an electrical circuit allowing current to flow around it. An independent voltage source may supply a constant voltage at all times regardless of the value of the current being supplied. A dependent voltage source may provide a voltage supply where the magnitude depends on either the voltage across or current flowing through some other circuit element. As a further example, a power supply port 136 may include a port whereby power is provided from a regulated power supply, including without limitation a rectifier or other converter where mains AC is converted to low-voltage DC power, a switching power supply, a transformer, a voltage or current regulator, or the like. In an embodiment, circuit verifier 104 that is connected to at least a circuit element 124 at a power supply port may be connected with connectors that may include without limitation PC Main power connectors, 12V power connectors, 12V system monitoring connectors, ATX12V 4-pin power connectors, 4-pin peripheral power connectors, 4-pin Molexs, auxiliary power connectors, serial ATA power connectors, 6-pin connectors, 6+2 pin connectors, IEC 60320 C14 connectors, and/or any other suitable electrical connector or probe. Circuit verifier 104 may also be connected between sub-elements of at least a circuit element 124 as described in more detail below in reference to FIG. 2.

Still referring to FIG. 1, circuit verifier 104 may be connected electrically to a radio-frequency receiver and/or transmitter. Radio-frequency receiver may be a component designed to sense and/or receive radio wave signals, and may, without limitation, include one or more tuned radio frequency amplifier stages followed by a detector circuit to extract an audio signal such as an audio frequency amplifier; radio-frequency transmitter may be a component designed to transmit radio-frequency signals. Circuit verifier 104 may be connected electrically to a magnetic flux sensor. The magnetic flux sensor may generate a signal output proportional to the magnetic flux in a magnetic field. A magnetic flux sensor may include a magnetic sensor, such as a Hall-effect sensor and/or a fluxgate sensor.

Figure 2:
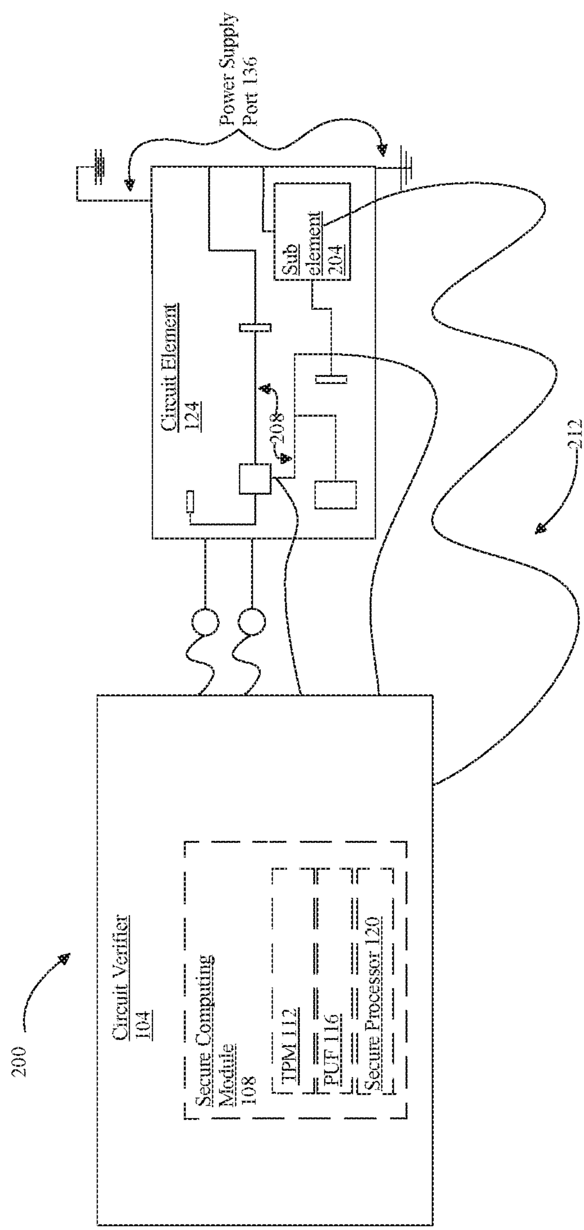
FIG. 2 is an exemplary embodiment of an apparatus for testing circuit elements at one or more locations on a circuit element.

Referring now to FIG. 2, an exemplary embodiment of an apparatus 200 for testing circuit elements at one or more locations on a circuit element is illustrated; apparatus 200 may include any apparatus 100 as described above, and apparatus 100 as described above may include any apparatus 200. FIG. 2 includes at least a circuit element as described above in reference to FIG. 1, consisting of one or more sub-elements connected to one or more connecting paths, including without limitation by way of a printed circuit board. Connecting paths and/or printed circuit board may include an analog circuit, which may include circuits in which the current or voltage may vary continuously with time to correspond to the information being represented. Connecting paths and/or printed circuit board may connect together and/or include at least a sub-element 204 which may include parts and/or materials that may make up an element of an analog circuit or digital circuit. A sub-element may include analog circuit components such as voltage sources, current sources, diodes, transistors, amplifiers, filters, rectifiers, and/or power converters. In an embodiment, an element of an analog circuit sub-element may include a resistor, a passive two-terminal electrical component that implements electrical resistance as a circuit element. Resistors may reduce current flow, adjust signal levels, divide voltages, bias active elements, and terminate transmission lines. Analog circuit sub-element may also include capacitors. Analog circuit sub-element may also include an inductor, a passive two-terminal electrical component that may store energy in a magnetic field when electric current flows through it. An inductor may include an insulated wire wound into a coil around a core. At least a sub-element and/or conducting path may include one or more diodes. Analog circuit sub-element may also include transistors, defined as semiconductor devices used to amplify or switch electronic signals and electrical power. A transistor may be composed of semiconductor material with three or more terminals for connection to an external circuit. A voltage or current applied to one pair of the transistor's terminals may control the current through another pair of terminals. A transistor may amplify a signal by modifying an amplitude of a current or voltage signal. Transistors may include bipolar transistors that may conduct using both majority and minority carriers. Common bipolar transistors include but is not limited to heterojunction bipolar transistor, Schottky transistor, avalanche transistor, Darlington transistor, insulated-gate bipolar transistor, phototransistor, multiple-emitter transistor, and/or multiple-base transistor. Transistors may also include field-effect transistors, which may use either electrons or holes for conduction. Common field-effect transistors include but are not limited to CNFET, JFET, MESFET, HEMT, MOSFET, ITFET, FinFET, FREDFET, thin-film transistor, OFET, ballistic transistor, floating-gate transistor, IFSET, EOSFET, and/or DNAFET. Transistors may also include transistors that are neither bipolar or common field, and may include but are not limited to tunnel field-effect transistor, diffusion transistor, unijunction transistor, single-electron transistors, nanofluidic transistor, single-electron transistor, nanofluidic transistor, multi-gate devices, junctionless nanowide transistor, vacuum-channel transistor, organic electrochemical transistor, and/or a solaristor. Conducting paths and/or at least a sub-element may also include operational amplifiers. An operational amplifier may include a two-port electronic circuit that may use electric power from a power supply to increase the amplitude of a signal applied to its input terminal, thereby producing a proportionally greater amplitude signal at its output; operational amplifiers may provide very high gain, which may be assumed for modeling purposes to be infinite, over a small-signal range. At least a sub-element and/or conducting paths may also include filters that perform signal processing functions to remove unwanted frequency components from a signal and/or to enhance wanted signals. In an embodiment, an analog circuit sub-element may also include a rectifier, an electrical device that may convert alternating current (AC) which may periodically reverse direction, to direct current (DC) which flows in only one direction. Rectifiers may be present in many different forms, including but not limited to diodes, mercury-arc valves, stacks of copper and selenium oxide plates, semiconductor diodes, silicon-controlled rectifiers, and other silicon-based semiconductor switches. Analog circuit sub-element may also include power converters, which may include a device for converting electrical energy such as converting between AC and DC or changing the voltage or frequency.

With continued reference to FIG. 2, in an embodiment, printed circuit board may include a digital circuit, with sub-element 204 including parts and/or materials that make up sub-elements of a digital circuit. Digital circuits may include circuits that operate using digital, discrete signals. Elements of a digital circuit may include transistors, logic gates, multiplexors, demultiplexors, and/or memory elements. A digital circuit sub-element may include a transistor as described in the preceding paragraph. A digital circuit sub-element may include logic gates which may include device that may implement a Boolean function such as an AND, OR, NAND, NOR, or XOR function, or the like. A logic gate may perform a logical operation on one or more binary inputs and produce a single binary output. Logic gates may be implemented using diodes or transistors that may act as electronic switches. Logic gates may also be constructed using vacuum tubes, electromagnetic relays, fluidic logic, optics, molecules, and mechanical elements. A digital circuit sub-element may also include a multiplexer, a device that selects one of several digital input signals, based for instance on one or more control signals, and forwards the selected input into a single line. A digital circuit sub-element may also include a demultiplexer, a device that may take a single input signal and select one of many data-output-lines, based for instance on one or more control signals, which is connected to the single input. A digital circuit may also include memory elements that may store a bit or logic. Memory components may include architectures such as core memory, bubble memory, latches, capacitors, flip-flops, and/or registers. In an embodiment a digital circuit may include a finite state machine, one or more arithmetic and/or logic units. A digital circuit or sub-element may include a processor, microprocessor, microcontroller, system-on-a-chip, or the like.

With continued reference to FIG. 2, at least a circuit element 124 may include one or more conducting paths 208, which may include wires or traces through which electric current can flow between elements and sub-elements located on at least a circuit element 124. Wires may include a single cylindrical flexible strand or rod of metal. Wires may bear mechanical loads or electricity and telecommunication signals. Wires located on at least a circuit element 124 may be solid core, stranded, or braided forms. One or more conducting paths 208 may also include traces which may connect various points such as elements and/or sub-elements together. In an embodiment, traces may include small lines of copper and/or aluminum that may connect elements and/or sub-elements together on a circuit board.

With continued reference to FIG. 2, apparatus 200 may be electrically connected to at least a circuit element 124.

Electrical connection may be performed at one or more locations on at least a circuit element 124; for instance, an electrical connection 212 may be placed at or within sub-element 204. Connection at a sub-element may include connections at data input and/or output ports of the sub-element, power supply ports of sub-element, and/or at one or more conducting paths, vertical interconnect accesses, component terminals, or the like within sub-element. Circuit verifier 104 may also be connected between sub-elements of at least a circuit element 124, such as for example on a conducting path between two or more sub-elements. Circuit verifier 104 may also be connected electrically at two points connected by an analog path on an analog circuit, such as an analog circuit path between two digital sub-elements or the like, as described above. Circuit verifier 104 may also be connected digitally at one or more digital elements located on a printed circuit board that contains a digital circuit as described above, where "connected digitally" signifies connected to one or more data output or input ports, terminals, or pins and configured to receive and/or transmit digital data at such connections. Digital elements may be connected by at least a printed circuit board path and circuit verifier 104 may be electrically connected to the printed circuit board path.

Referring again to FIG. 1, one or more circuit elements 124 and/or circuits may be fabricated together to form an integrated circuit. This may generally be achieved by growing at least a wafer of semiconductor material, doping regions of it to form, for instance, npn junctions, pnp junctions, p, n, p+, and or n+ regions, and/or other regions with local material properties, to produce components and terminals of semiconductor components such as base, gate, source and drain regions of a field-effect transistor such as a so-called metal oxide field-effect transistor (MOSFET), base, collector and emitter regions of bipolar junction BJT transistors, and the like. Persons skilled in the art will be aware of various forms or categories of semiconductor devices that may be created, at least in part, by introducing dopants to various portions of a wafer. Further fabrication steps may include oxidization or other processes to create insulating layers, including without limitation at the gate of a field-effect transistor, formation of conductive channels between components, and the like. In some embodiments, logical components may be fabricated using combinations of transistors and the like, for instance by following a complimentary MOSFET (CMOS) process whereby desired element outputs based on element inputs are achieved using complementary circuits each achieving the desired output using active-high and active-low MOSFETS or the like. CMOS and other processes may similarly be used to produce analog components and/or components or circuits combining analog and digital circuit elements. Deposition of doping material, etching, oxidization, and similar steps may be performed by selective addition and/or removal of material using automated manufacturing devices in which a series of fabrication steps are directed at particular locations on the wafer and using particular tools or materials to perform each step; such automated steps may be directed by or derived from simulated circuits as described in further detail below.

With continued reference to FIG. 1, fabrication may include the deposition of multiple layers of wafer; as a nonlimiting example, two or more layers of wafer may be constructed according to a circuit plan or simulation which may contemplate one or more conducting connections between layers; circuits so planned may have any three-dimensional configuration, including overlapping or interlocking circuit portions, as described in further detail below. Wafers may be bound together using any suitable process, including adhesion or other processes that securely bind layers together; in some embodiments, layers are bound with sufficient firmness to make it impractical or impossible to separate layers without destroying circuits deposited thereon. Layers may be connected using vertical interconnect accesses (VIA or via), which may include, as a non-limiting example, holes drilled from a conducting channel on a first wafer to a conducting channel on a second wafer and coated with a conducting material such as tungsten or the like, so that a conducting path is formed from the channel on the first wafer to the channel on the second wafer. Wafers may be constructed with sufficient thinness to permit VIA-based PUF construction as described in further detail below. VIAs may also be used to connect one or more semiconductor layers to one or more conductive backing connections, such as one or more layers of conducting material etched to form desired conductive paths between components, separate from one another by insulating layers, and connected to one another and to conductive paths in wafer layers using VIAs.

Still referring to FIG. 1, fabrication may include simulation on a computing device, which may be any computing device as described in this disclosure. Simulation may include, without limitation, generating circuit diagram such as a digital or logical circuit diagram; digital or logical circuit diagram may be used in an automated manufacturing process to print or etch one or more chips and/or integrated circuits. Circuit configurations to hardcode logical or mathematical processes as described below may be simulated prior to physical fabrication; similarly, garbled circuits, circuits generated to instantiate one or more secure multiparty computations as described in further detail below, and/or circuit configurations arranged to make probing or analysis physically infeasible may be simulated, for instance by first generating a simulation of a circuit to produce a desired output and then modifying it according to garbling, secure multiparty computation, or obfuscating protocols to create a second simulation from which the circuit or circuit element may be physically fabricated.

With continued reference to FIG. 1, simulation may be performed in a computer-assisted design (CAD) program. CAD program may include a circuit simulation program and/or a program that permits circuit design, such as without limitation Simulation Program with Integrated Circuit Emphasis (SPICE), products based on SPICE, or similar products. CAD program may support layout of circuits including without limitation printed circuit boards (PCB), and the like. CAD program may support, without limitation, circuit schematic diagram drawing, schematic capture and/or design, printed circuit board (PCB) layout production to include both track and component views manual component placement, automatic component placement, manual and automatic routing of PCB tracks, automated guidance of correct track and pad sizing, automated guidance of requirements for double-sided or multiple circuit boards such as without limitation mother and daughter boards, automated enforcement of one or more design constraints such as, without limitation, a size of a PCB, automated or manual incorporation of test points or test indicators, automated or manual inclusion of mounting holes, automated or manual inclusion of vertical interconnect accesses, automated or manual inclusion of component and/or pin identification, and/or bill of material production. CAD program may include one or more parts or component libraries. CAD program may support generation of export files and/or importation of files, including without limitation Gerber files, Drawing Exchanger Format (DXF) files, intermediate data format (IDF) and related files, comma-separated value (CSV) files, text (TXT) files, and the like. CAD programs may include, without limitation DIPTRACE by Stanislav Ruyev and Victor Savenko of Ukraine, SOLIDWORKS PCB as produced by Dassault Systems Solidworks Corporation of Waltham, Mass., Altium Designer 17, ULTIBOARD by National Instruments Corporation of Austin, Tex., PCB ARTIST by Advanced Circuits of Aurora, Colo., PCBWEB, believed to be produced by Silicon Frameworks, LLC of Boise Id., BSCH3V by Suigyodo, Orcad, Mentor Graphics, and the like; field programmable gate array (FPGA) design tools and application specific integrated circuit (ASIC) design tools such as those produced by Xilinx, Altera/Intel, Cadence Design Systems, Synopsys, Spectre, and others, design verification tools such as those produced by Tortuga Logic, and the like.

Still referring to FIG. 1, CAD program or a similar program may be used to generate and/or design a circuit diagram, to produce a PCB layout, to incorporate components from component or part libraries, or the like. CAD program may be used to generate one or more instructions for printing, etching, assembly, or other automated manufacturing steps to combine or manufacture circuits, including without limitation PCBs, chips, and/or components. For instance, a user may design a circuit topology for at least a circuit element based on an intended output; intended output may include, without limitation, device-specific secret, a share or hash based on device-specific secret, a digital signature or proof based on device-specific secret, or the like. Where at least a circuit element includes a physically unclonable function (PUF) as described below, user may design a circuit configured to produce an output of the PUF, without necessarily knowing what the output will be, aside from, as an example, a number of output pins by which output will be produced. Thus, for instance, where manufacture of at least a circuit element includes manufacture of an intrinsic PUF as introduced in further detail below, simulation may involve simulation of an integrated circuit to be used as the PUF, whereas manufacturing variations used to generate the unpredictable response of the PUF may be produced during manufacturing itself, and thus inherently may not be simulated.

With continued reference to FIG. 1, simulation may include, without limitation, insertion of one or more components in simulated circuit. One or more components may be inserted, for instance, by retrieval from one or more component libraries; as a non-limiting example, a manufacturer and/or designer may specify that a particular component be inserted at a particular node or connected to one or more wires, by dragging or otherwise copying a visual representation of the component onto the circuit, by selecting one or more nodes or wires and commanding insertion of a component by part number, selection from a dropdown list, or the like, or by any other suitable means. Insertion of a component may include specification of one or more wire or terminal connections. Insertion of a component may include specification of a manner for inclusion in a physical circuit to be manufactured; for instance, insertion may include specification whether the component is to be formed with an integrated circuit via CMOS or similar processes or to be attached to the integrated circuit via soldering or the like after separate acquisition or formation. Components simulated may include analog and/or digital components, including without limitation capacitors, inductors, diodes, triodes, transistors, operational amplifiers, logic gates, multiplexors, demultiplexers, latches, flip-flops, inverters, timers, oscillators, sensors, and/or any other elements suitable for inclusion in any circuit as described herein, which may occur to any person skilled in the art upon review of the entirety of this disclosure.

Still referring to FIG. 1, simulation may involve arranging or transforming circuit topology to conform to one or more components to be manufactured, including one or more integrated or printed circuits. Topology may include two-dimensional topology on a single wafer or three-dimensional topology in which a plurality of circuit elements, loops, or other portions are distributed between two or more stacked wavers and connected using VIAs. Topological arrangements may be subjected to one or more automated constraints; for instance, limitations of the area of wafers or chips, along with footprints of components and/or conductive paths may be simulated to limit the scope of a simulation to a chip and/or integrated circuit that is possible to integrate using existent manufacturing methods. Similarly, components that project from a surface of a chip may be constrained to upper or lower layers of a multilayered construction. Topology may be further transformed or arranged to obfuscate or frustrate analysis through probing; for instance, two or more circuits may be simulated as combined in the same single or multilayered chip, with overlapping portions such that probing would likely connect two unrelated circuits. Persons skilled in the art, upon reviewing the entirety of this disclosure, will be aware of various alternative or additional ways in which circuit topologies may be simulated for purposes described herein.

With continued reference to FIG. 1, one or more circuit simulation steps as described above may be automated; for instance, one or more circuit portions, elements, components, or the like may be automatedly connected in simulated form. Where a circuit or a portion thereof being simulated is a logic circuit, simulation may include generating a set of logic gates to perform logical operations or map inputs to outputs as specified by one or more commands or instructions describing desired sets of inputs and output and/or desired logical operations to be implemented. Obfuscation may include converting a first logic circuit performing a particular input-output mapping into a second circuit or set of circuits accomplishing similar or related mappings of inputs to outputs, for instance to implement a secure multiparty computation circuit as described in further detail below. Simulation may include use of formal verification methods, including methods incorporating netlist flattening techniques, reverse engineering techniques on circuit data, either schematic, RTL, and/or derivation from physical, optical or other noninvasive circuit measurement techniques. Reverse engineering techniques may include graph pattern matching and other models of tamper analysis to identify unique features or high value features such as encryption circuitry, hash function circuitry and the like. Such techniques may further include use of principle components analysis, random element selection, use of HAL, ANGEL and related techniques for identifying injection unique features of value or potential modifications of unique features of value, such as those mentioned herein.

In an embodiment, and continuing to refer to FIG. 1, simulation and/or physical manufacture of at least a circuit element may incorporate one or more genuinely random processes, for instance as generated by a unique object (UNO) fingerprint, and/or a PUF (PUF) as described in further detail below, or any other disorder-based security primitive, defined as a function that creates challenge responses from a physical circuit that depend on unique features of that circuit, including without limitation microstructure features or elements that depend on random physical factors occurring or conferred during manufacture. In an embodiment, and as further illustrated below, introduction of random processes into physical fabrication and/or simulation may result in circuit configurations not fully known to a manufacturing entity or device; for instance, a fabrication process introducing one or more random steps may generate a circuit having parameters not fully matching a simulated circuit from which the fabrication is derived. This may further be accomplished through the generation of PUFs as described in further detail below.

With continued reference to FIG. 1, at least a circuit element 124 may include a circuit chip. A circuit chip may include a set of electronic circuits such as an integrated circuit located on one small flat piece or "chip" of semiconductor material, such as silicon. A circuit chip may include one or more components that have fabricated together using MOSFET and/or CMOS process as described in more detail above. A circuit chip may include watermark features identifying one or more genuine manufacturers, e.g. via mask-specific features placed at the semiconductor bulk substrate, doped regions, oxide layer, metal layer, and/or SiO2 layers. A circuit chip may include a microprocessor, which incorporates the functions of a central processing unit on a single integrated circuit, or at most a few integrated circuits. At least a circuit element 124 may include a printed circuit element. A printed circuit element may include a printed circuit board. Generally, a printed circuit board may include integrated circuits interconnected with copper traces. A printed circuit board may include a flat sheet of insulating material and a layer of copper foil, laminated to the substrate. Chemical etching may divide the copper into separate conducting lines or tracks, to pass connections between layers of copper. The tracks may be insulated from each other by air and the board substrate material. The surface of a printed circuit board may have a coating that protects the copper from corrosion and reduces chances of solder shorts. A board may mount components such as through hole components by their wire leads passing through the board and soldered to traces on the other side. Surface mount components may be attached by their leads to copper traces on the same side of the board. Surface mounts may be used for transistors, diodes, integrated circuit chips, resistors, and capacitors found on a printed circuit board. Through hole mounting may be used for large components found on a printed circuit board such as electrolytic capacitors and connectors. A printed circuit board may include multiple layers, and the layers may be laminated together in an alternating pattern of copper and substrate. Substrate may include material such as FR-4 glass epoxy or cotton paper containing phenolic resin. A printed circuit board may include a printed wiring board which includes a printed circuit board with no components installed. A printed circuit board containing electronic components may include a printed circuit assembly.

Continuing to refer to FIG. 1, at least a circuit element 124 may include a digital circuit, operating on digital signals. A digital circuit may be constructed from logic gates, which include small electronic circuits. Each logic gate may perform Boolean logic when acting on logic signals. In an embodiment, at least a circuit element 124 may include an analog circuit, which may operate with a continuously variable signal. In an embodiment, an analog circuit may be comprised of resistors, capacitors, and inductors and be considered to be entirely passive. In yet another non-limiting embodiment, an analog circuit may contain active elements such as transistors.

With continued reference to FIG. 1, and as discussed in further detail below in reference to FIG. 3, apparatus 100 may receive a fingerprint 112 of at least a circuit element 124. Fingerprint 112 may include at least an expected output corresponding to at least a test input of at least a circuit element 124. At least an expected output may be an output that may be expected to be produced to a high degree of certainty when a specific test input is applied. At least an expected output may be highly reproducible. In an embodiment, expected output may be known by manufacturer, generated using simulation, generated by testing a sub-element of at least a circuit element 124, or the like.

With continued reference to FIG. 1, apparatus 100 may connect to at least a circuit element 124 via at least a data input port 128 of the at least a circuit element 124. At least a data input port 128 may include at least a location on at least a circuit element 124 where a signal may be input, as described above. Data input port 128 may be stimulated with an input so that at least a circuit element 124, which may be referred to as in a state known as a "device under test" (DUT), to produce a test output at a data output port 132 as described above. Test output may then be compared to an expected output of the fingerprint of the at least a circuit element 124. A test input at data input port 128 may be implemented by various methods including Verilog Test Bench and Bluespec System Verilog (BSV), or similar implementation using any hardware description language including system Verilog, VHDL, Chisel, and the like. A test output captured at data output port 132 may be any output that results from a circuit set into action by a test input. For example, an output may include light, for instance as produced by a light-emitting diode (LED) or lamp, sound as produced by a sound-producing component including without limitation a speaker or buzzer, kinetic energy as produced by components that may include, without limitation piezoelectric components, motors, stepper motors, solenoids, a display element such as without limitation a seven-segment display, one or more outputs of data such as binary data or analog signal data, power consumption, current draw, and/or capacitance readings. Test output may include output level produced as a result of radio frequency input. In an embodiment, test input may be implemented by a transaction level test whereby initial architecture state of at least a circuit element 124 is recorded, and sequences of input messages are passed through at least a circuit element 124. Arrival time for each message may be recorded; test output using this transaction level test may include a final architecture state and a sequence of output messages. A timestamp may be recorded when each outgoing message is received by a testbench. A separate program may then compare test output to fingerprint of the at least a circuit element 124. In an exemplary embodiment, a UTL model may then generate a reference output stream to compare test output to the fingerprint. Methods for how these comparisons are performed will be described in more detail below in reference to FIG. 3. In an embodiment, test input and test output may be generated according to a non-blocking cache test. In an example, test input may contain a sequence of load/store requests, timestamped with arrival time and including initial state of cache and memory system. Test output may contain a sequence of timestamped responses plus final cache and memory state. Test output may be compared to the fingerprint of the at least a circuit element 124 using, as a non-limiting example, a top-level UTL model to process inputs and generate the fingerprint. Such a comparison may ignore order of output messages but ensure that each tagged value matches that of the fingerprint, and that every expected output that is included in the fingerprint is present in test output. Additional and/or missing outputs present in test output may indicate some type of corruption to the at least a circuit element 124.

Still referring to FIG. 1, any attestation, signature, fingerprint, and/or other record described in this disclosure may be timestamped using a secure timestamp. Generating a secure timestamp may include digitally signing the secure timestamp using any digital signature protocol as described herein. In one embodiment authenticity of received data signals is established by utilizing a chain of attestation via one or more attestation schemes (in nonlimiting example, via DAA) to verify that a secure computing module 108 or other device is an authentic secure computing module 108 or other device that has the property of attested time.

With continued reference to FIG. 1, secure timestamp may be record a current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 108. Additional data may include one or more additional data, including sensor data or a hash of data, that are received or generated by a temporal attester, including which may include any computing device described herein. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). A TSA may alternatively or additionally be implemented as a distributed TSA, for instance as described in U.S. Nonprovisional application Ser. No. 16/680,787. The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively or additionally, one or more additional participants, such as other remote devices may evaluate confidence levels in at least a remote device or other party generating secure timestamp and/or perform threshold cryptography with a plurality of such parties, each of which may have performed an embodiment of method to produce a secure timestamp. In an embodiment, remote devices or other parties authenticating first digitally signed assertion may perform authentication at least in part by evaluating timeliness of entry and/or generation of first digitally signed assertion as assessed against secure timestamp. In an embodiment, secure proof is generated using an attested computing protocol; this may be performed, as a non-limiting example, using any protocol for attested computing as described above.

Continuing to refer to FIG. 1, expected output may include an expected amount of power consumption and the at least a test output may include detected amount of power consumption by the at least a circuit element in response to the at least a test input. Power consumption may include the amount of energy per second that at least a circuit element 124 may dissipate. Power consumption may be measured in watts, current draw, voltage drop, or the like. Power consumption may include more current draw than expected and/or more power consumption than expected. In an increase in either current draw and/or power consumption of at least a circuit element 124 may indicate that one or more elements may have been added to the system and may be drawing more power. In an embodiment, at least a circuit element 124 that has been corrupted and has for example an additional resistor, additional logic circuitry, or the like it may consume power more quickly because there are additional hardware components that may be causing energy to dissipate more quickly than expected; similarly, a digital circuit that has been altered to function differently may consume more or less power than the circuit as originally designed. In such an instance, because at least a test output would deviate from expected output or, at least a circuit element 124 producing such a test output may be flagged as suspicious or subjected to an additional test input.

With continued reference to FIG. 1, expected output may include an expected current draw and the at least a test output may include a measured current drawn by the at least a circuit element in response to the at least a test input. Current draw may include the movement of charges in a conductor. Current draw may be measured in amperes. Current draw may be measured using an ammeter, by detection of a voltage drop across a resistor, or the like. Various techniques are available to measure current draw, and this may include shunt resistors, hall effect current sensor transducers, transformers, and/or magneto resistive field sensors. Shunt resistors may measure current by inserting a device known as a shunt, to allow electric current to pass around another point in the at least a circuit element 124 by creating a low resistance path. In an embodiment, at least a circuit element 124 that is grounded on one side may have a current measuring shunt inserted either in the ungrounded conductor or in the grounded conductor. A shunt inserted in an ungrounded conductor may be insulated for the full circuit voltage to ground. Hall effect current sensor transducers may measure current draw by producing a voltage difference across an electrical conductor, transverse to an electric current in the conductor and to an applied magnetic field perpendicular to the current. In an embodiment, Hall effect devices may be immune to elements that may corrupt them easily, such as dust, dirt, mud, and water. Current draw may also be measured by a current transformer, that measures alternating current. Current transformers produce a current in its secondary which is proportional to the current in its primary. Current draw may alternatively or additionally be measured by magnetoresistance, which is the tendency of a material to change its value of its electrical resistance in an externally applied magnetic field.

With continued reference to FIG. 1, expected output and/or test output may include an expected or measured voltage drop across power supply terminal 136 or between any other two points in at least a circuit element 124. Voltage as used herein is the difference in electrical potential between two points. Voltage may be defined as the work needed per unit of charge to move a test charge between the two points, as measured in volts. Electric potential differences between two points may be caused by electric charge, electric current through a magnetic field, time-varying magnetic fields, and/or some combination of these. A voltmeter may be used to measure the voltage between two points in a circuit. A voltage may represent either a source of energy or lost, used, or stored energy. Power output port 136 includes a ground, which may be a reference point in which voltages are measured. A ground may include a return path for electric current, or a direct physical connection to the ground and/or earth. A ground may be useful in calculating and measuring voltage because the Earth may serve as a constant potential reference against which other potentials can be measured.

With continued reference to FIG. 1, test output may include capacitance readings. Capacitance readings may reflect the amount of stored electric energy when disconnected from a charging circuit. Capacitance may be measured in units including the farad, microfarad, and picofarad. In an embodiment, a capacitance reading that falls outside of normal expected values may indicate, for instance, an unexpected number of transistors or other elements in a circuit. Similarly, capacitance readings may reflect instability in at least a circuit element 124, potentially indicating corruption of at least a circuit element 124. In an embodiment, capacitors that are defective right away after manufacture and unable to generate capacitance readings may also indicate some sort of corruption of at least a circuit element 124. Testing of test output may include testing for radio signals. In an embodiment, at least a circuit verifier 104 may be electrically connected to a radio-frequency receiver. Manufacturer may check at least a circuit element 124 to see if it produces a radio signal where there should not be one. At least a circuit verifier 104 that has been corrupted may have elements added that may produce a radio signal when there should not be one.

Figure 3:
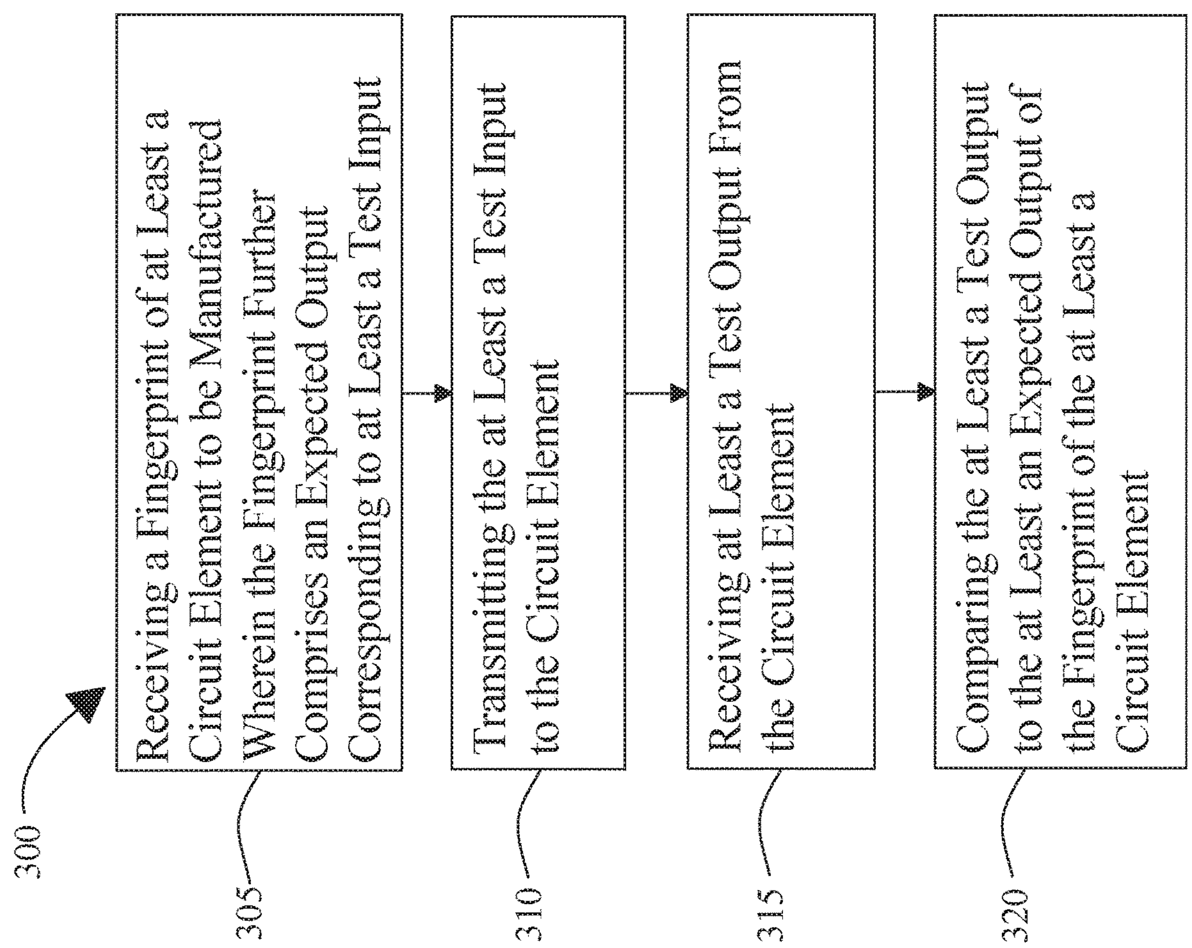
FIG. 3 is an exemplary embodiment of a method for testing circuit elements at one or more stages of manufacturing.

Referring now to FIG. 3, an exemplary embodiment of a method 300 for testing circuit elements at one or more stages of manufacturing is illustrated. At step 305, circuit verifier 104 receives a fingerprint of at least a circuit element 124 to be manufactured, wherein the fingerprint may include at least an expected output corresponding to at least a test input. In an embodiment, receiving a fingerprint of at least a circuit element may include receiving at circuit verifier 104 a schematic, and generating at circuit verifier 104 a fingerprint as a function of the schematic. A schematic may include a representation of elements of at least a circuit element 124 and may include abstracts and graphic symbols. A schematic may be drawn by hand or it may be generated using computer technology. A schematic may show the components and interconnections of at least a circuit element 124 using standardized symbolic representations. The presentation of interconnections between circuit components in a schematic may not necessarily correspond to the physical arrangements in a finished device. For example, a schematic for at least an electronic circuit element 124 may be prepared using schematic capture tools and/or schematic entry tools. These tools may be integrated into an integrated circuit design flow and may be linked to other EDA (electronic design automation) tools for verification and simulation of at least a circuit element 124 that is under design. A schematic may be created or recreated in a simulator that will predict one or more outputs. A simulator may include a machine with a similar set of controls designed to provide a realistic imitation of the operation of a circuit. In an embodiment, a simulator may also include machines and/or equipment to generate manufacture of at least a circuit element and may simulate testing of circuits. In an embodiment, simulator may be located at same location as where manufacture of at least a circuit element 124 occurs. In an embodiment, simulator may be located at a different location.

Continuing to refer to FIG. 3, generating a fingerprint as a function of the schematic may be done by converting the schematic into a layout that can be fabricated onto at least a circuit element 124 by the process of schematic capture. For example, the process may first start with converting a schematic into a netlist, or description of the connectivity of at least a circuit element 124. A netlist may consist of a list of the electronic components in at least a circuit element 124. A netlist functions to convey connectivity information. In an embodiment, a netlist may provide instances, nodes, and attributes of the components involved in at least a circuit element 124. In yet another non-limiting embodiment, a netlist may contain hardware description language such as Verilog or VHDL, languages designed specifically for input to simulators. Netlists may be physical or logical, instance-based or net-based, and flat or hierarchical, including either folded or unfolded. Netlists may contain or refer to descriptions of the parts or devices used in at least a circuit element 124. An "instance" may include each time a part is used in a netlist. Descriptions included in a netlist may contain a list of the connections that are made to each part or device, and some basic properties of the part or device. An instance may include a wide range of parts and/or devices including for example, a MOSFET transistor, a bipolar transistor, a resistor, a capacitor, and an integrated circuit chip. Instances included on netlists may have terminals, with each terminal having a specific name. Netlists may also include networks or "nets", which may include wires that connect things together in at least a circuit element 124. Nets may include special attributes in their design and may be described in more detail in a netlist. Instance-based netlists may provide a list of the instances used in a design. Such a description in a netlist may include each instance, along with either an ordered list of net names or a list of pairs provided of an instance port name, along with the net name to which that port is connected. An example of instance-based netlist may include simulation program with integrated circuit emphasis (SPICE). Net-based netlists may describe all the instances and attributes, each net, and a description of each port that they are connected on each instance. An example of a net-based netlist may include electronic design interchange format (EDIF). After a netlist has been produced through a process of schematic capture, a subsequent step may be to produce a rat's nest. A rat's nest may include a jumble of wires that cross over one another to their destination node. Wires in a rat's nest may be routed manually or automatically through the use of electronic design automation (EDA) tools. A rat's nest may assist in placing, to determine the location of active components of at least a circuit element 124. Once a rat's nest has been produced and placement has occurred, routing may occur in the schematic capture process. Routing may assist in adding wires needed to properly connect placed components. The primary task associated with routing may be to create geometrics such that all terminals assigned to the same net are connected, no terminals assigned to different nets are connected, and all design rules are obeyed. Routing may be accomplished by manual routers and/or software based interactive routers. Interactive routers may include autorouters that route all remaining unrouted connections without human intervention. Autorouters may include maze routers such as Lee router, Hadlock router, and Flood router; Line-probe router such as Mikami-Tahuchi router, and Hightower router; Pattern router; Channel router such as Switchbox router, River router, and Spine and stitch router; Gridless router such as Area router, Graph theory-based router, and Topological router. After routing has occurred, a schematic capture process may continue with circuit layout, also known as mask designed layout. This may include representation of at least a circuit element 124 in terms of geometric shapes which correspond to the patterns of metal, oxide, or semiconductor layers that may make up components of at least a circuit element 124. Circuit layout may be done by hand using opaque tapes and films and may also be done automatically using software such has EDA tools. EDA tools may assist in arranging and rearranging components and find paths for tracks to connect various nodes. This may result in the final layout artwork for at least a circuit element 124. In an embodiment, elements that comprise at least a circuit element 124 may connect at points that are not output terminal of at least a circuit element 124, but instead may connect at output terminals of particular elements or between a power source and ground.

Figure 4:
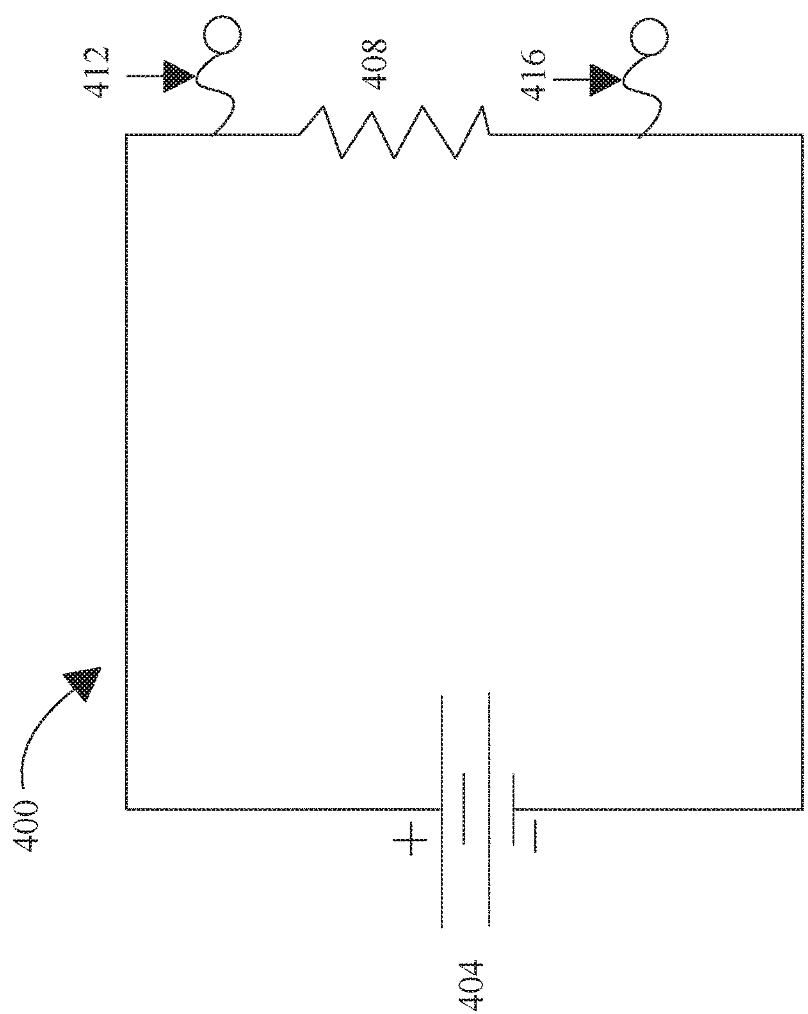
FIG. 4 is an exemplary embodiment of a Thevenin equivalent of an analog circuit.

Schematic and/or designs derived therefrom may be used to produce one or more simplified circuit models indicating expected outputs or "appearance" of circuit element or a sub-element thereof as seen from a given port or terminal. For instance, as illustrated in FIG. 4, analog circuits including or that may be approximated over a given range as including a network of voltage sources and resistors may be represented with a Thevenin equivalent having one resistor and one voltage source, for the given range 400. In an embodiment, Thevenin's theory may allow a one port network to be reduced to a single voltage source and a single impedance, showing an example of predicted outputs from some, but not all analog circuits. Embodiment 405 illustrates a voltage element which may be a component of an analog circuit and which may feed voltage when an analog circuit is turned on. Embodiment 410 illustrates a resistor which may be a component of an analog circuit. In an embodiment, an analog circuit may be comprised of other elements such as additional resistors, capacitors, inductors, diodes, transistors, and operational amplifiers. Embodiment 415 illustrates a test input being applied to an analog circuit, and embodiment 420 illustrates a test output produced as a result of test input 415. In an embodiment, test input 415 may not be applied at voltage element 405 but may be applied at another location on analog circuit. In an embodiment, test output 420 may be located at various locations of an analog circuit. In addition to being located at an output terminal of an analog circuit, test output 420 may be located at output terminals of various elements of an analog circuit or located between a power source and ground. Other simplified equivalents to other circuits may similarly be generated.

Referring back now to FIG. 3, receiving fingerprint of at least a circuit element 124 may include receiving an expected output of a physically unclonable function (PUF), such as PUF output received from a previously tested sub-element of at least a circuit element 124. In an embodiment, PUF includes one or more non-intrinsic PUFs. Non-intrinsic PUFs may include without limitation optics-based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 3 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 3, non-intrinsic PUF may include one or more electronics-based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 3, PUF may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 3, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay-based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 3, PUF may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF in an embodiment include without limitation buskeeper PUFs, which may be similar to other PUFs based on bistable memory elements but leveraging buskeeper cells. PUF may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

Continuing to view FIG. 3, PUF may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 3 PUF may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 3, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode-based PUFs.

Continuing to refer to FIG. 3, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique IDs based on such fluctuations, in a manner unpredictable even to the manufacturer.

With continued reference to FIG. 3, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a circuit element. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 3, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 3, PUF may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 3, PUF may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultra-short optical pulses (e.g. in the femtosecond to attosecond region) may be used to probe micro-cavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 3, other examples of PUF that may be used may include, without limitation, nano-electromechanical (NEM) PUFs. NEM PUFs may include PUFs that leverage stiction of a silicon nanowire to a binary gate structure. NEM PUFs may include those based on interfacial magnetic anisotropy energy, such as use of the random distribution of magnetization orientation originating from the sub-nanometer variation of oxide layer produced by the thinning process. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

With continued reference to FIG. 3, in an embodiment, at least a circuit element 124 may be assembled by inclusion of a sub-element having a known PUF output, which may be checked at various stages of manufacturing to ensure that the same PUF is generated after at least a circuit element 124 has been assembled with other components and/or parts added onto it. A deviation from an expected PUF output may indicate the presence of additional parts and/or devices that may be causing an unexpected PUF to be generated that deviates from the known and expected PUF. In an embodiment, receiving a fingerprint of at least a circuit element 124 comprising an expected output of a PUF may be used by the manufacturer to audit a series of PUFs produced by a series of at least a circuit element 124 to ensure that each PUF is unique and not overly predictive of a certain manufacturer.

With continued reference to FIG. 3, receiving a fingerprint of at least a circuit element 124 from at least a circuit element to be manufactured may include receiving a fingerprint of at least a circuit element from at least an additional device, which may include any computing device as described in this disclosure; at least an additional device may be operated by a manufacturer of at least a circuit element 124 of a sub-element, as a non-limiting example. In an embodiment, fingerprint of at least a circuit element 124 may be contained in a distributed data structure, including without limitation a blockchain or the like. In an embodiment, at least a device may have access to a distributed data structure containing fingerprint and circuit verifier 104 may receive fingerprint from at least a device by way of the distributed data structure.

Still referring to FIG. 3, distributed data structure ma include a secure listing. A "secure listing," as used in this disclosure, is a data structure including digitally signed assertions, credentials, and/or authentication tokens, where "including" an element of data signifies containing the element itself and/or a representation thereof such as a cryptographic hash, Merkle root, or the like, such that inclusion or "membership" in the secure listing can be proven. Membership in the secure listing may be revoked, in non-limiting example a secure listing may define the set of non-revoked members within a given temporal epoch. In non-limiting example, Membership may be proven by demonstrating that a member is not on a revocation list by means of secure proof or any method known to those skilled in the art. A secure listing may include a cryptographic accumulator. A "cryptographic accumulator," as used in this disclosure, is a data structure created by relating a commitment, which may be smaller amount of data that may be referred to as an "accumulator" and/or "root," to a set of elements, which may include without limitation textual elements, authentication tokens, digitally signed assertions, and/or credentials, together with membership and/or nonmembership proofs for any element in the set. In an embodiment, these proofs may be publicly verifiable against the commitment. A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. For instance, a cryptographic accumulator may be implemented as a Merkle tree and/or hash tree, in which each accumulated element created by cryptographically hashing a lot of data. Two or more accumulated elements may be hashed together in a further cryptographic hashing process to produce a node element; a plurality of node elements may be hashed together to form parent nodes, and ultimately a set of nodes may be combined and cryptographically hashed to form root. Contents of root may thus be determined by contents of nodes used to generate root, and consequently by contents of accumulated elements, which are determined by contents of lots used to generate accumulated elements. As a result of collision resistance and avalanche effects of hashing algorithms, any change in any lot, accumulated element, and/or node is virtually certain to cause a change in root; thus, it may be computationally infeasible to modify any element of Merkle and/or hash tree without the modification being detectable as generating a different root. In an embodiment, any accumulated element and/or all intervening between accumulated element and root 308 may be made available without revealing anything about a lot of data used to generate accumulated element.

Continuing to refer to FIG. 3, a secure listing may include a zero-knowledge set. A "zero-knowledge set," as defined in this disclosure, is a set of elements of textual data such as strings, to which a prover may commit such that after commitment the prover can prove, for any textual datum, whether the textual datum is or is not in the set without revealing any knowledge about the set and/or any element thereof beyond the verity of such membership assertions.

Continuing to refer to FIG. 3, a secure listing may include a range proof, defined for purposes of this disclosure as a set-membership proof with respect to a set that is a sequence of values on a range between upper and lower bounds, such as an open or closed set on the real number line or the like.

Still referring to FIG. 3, a secure listing may include a temporally sequential listing, which may include any set of data used to record a series of at least a digitally signed assertion in an inalterable format that permits authentication of such at least a digitally signed assertion. In some embodiments, secure listing records a series of at least a digitally signed assertion in a way that preserves the order in which the at least a digitally signed assertion took place. Secure listing may be accessible at any of various security settings; for instance, and without limitation, secure listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

In an embodiment, and further referring to FIG. 3, measurable parameters of an integrated circuit sub-circuit and the at least a top-level (meaning deposited above, or later in the fabrication process of, the semiconductor substrate) metal layers used to route connections to the exterior of the silicon die may be measured to form a device and manufacturing stage specific fingerprint. As another non-limiting example, an integrated circuit and/or packaging thereof via wire bonds, through-silicon vias (TSVs), or other means of connecting from integrated circuit to something at the package physical boundary may be measured via any of the above means. As a further example, and without limitation, a packaged integrated circuit physical boundary and a printed circuit board (PCB) or equivalent physical medium for carry of signals from the integrated circuit to at least another component may be measured. In an additional non-limiting example, an interface between a packaged integrated circuit physical boundary and at least a mechanical enclosure of an assembly connected to and/or containing the integrated circuit may be measured. Measurement as described above may be stored in the clear and/or encrypted, on the device, in an append-only ledger, a distributed hash table, and/or trusted third party database. A measurement may be signed by a verified evaluator whose public key is accessible for verification. A measurement may be authenticated at subsequent manufacturing or user flow stages to ensure that a state of the device has not been compromised; such subsequent authentication may be utilized to implement digital rights management, such as the enforcement of licensed physical device IP, licensed firmware or software, and the like. Such authentication may make use of additional corroborating information such as time, date, location, user identification, and the like.

Continuing to refer to FIG. 3, non-limiting examples of indicia usable for measuring the properties of a path or coupling between stages of assembly described above include electrical, optical or acoustic impedance mismatch sufficient to establish a response in time or frequency domain, in non-limiting example using time domain reflectometry (TDR), a characteristic response of a system or subsystem, e.g. any arrangement of elements such that the result may be modeled as a resistor-capacitor (RC) filter, a resistor-inductor (RL) filter, an inductor-capacitor filter (LC), an inductor-capacitor-resistor (LCR) filter, surface acoustic wave (SAW) filter, or anything that may be modeled via an infinite impulse response (IIR) and/or finite impulse response (FIR) filter, mechanical response of a system or subsystem, e.g. the characteristic resonance of an enclosed or partially enclosed volume, an electromagnetic signal of a system or subsystem, a diffraction pattern, speckle pattern as described above, luminescence and/or absorption spectra of a device in response to a test input, e.g. for lattice point defect based signatures, or the like. Persons skilled in the art, upon reviewing the entirety of this disclosure, will be aware of various additional indicia and/or means for measurement as described above.

With continued reference to FIG. 3, at step 310 circuit verifier 104 transmits at least a test input to the at least a circuit element 124. Test input may include any of the test inputs as described above in reference to FIG. 1. Test input may include inputs that may provide information pertaining to circuit elements. In an embodiment, test input may include a waveform input that is input at a portion of at least a circuit element 124 that may provide a meaningful response. A waveform may include a variable that varies with time, and may include a voltage or current. A waveform may include periodic waveforms such as a sine wave, square wave, triangle wave, and/or sawtooth wave. In an embodiment, test input may include radio frequency signal, time domain reflectometry signal, impulse response, and the like. Radio frequency may include oscillation rate of an alternating electric current or voltage of at least a circuit element 124. In an embodiment, test input may include a radio wave signal which may poll at least a circuit element at a range of frequencies to detect implanted RFID (radio frequency identification) devices, near-field communication devices, or the like. Test input may include an electrical signal such as an analog signal and/or digital signal. An analog signal may include a continuous signal for which the time varying feature of the signal is a representation of some other time varying quantity. For example, an audio analog signal may have the voltage of the signal vary continuously with the pressure of sound waves. A digital signal may include a signal that is constructed from a discrete set of waveforms of a physical quantity so as to represent a sequence of discrete values. A digital signal may include a logic signal which may include only two possible values and describes an arbitrary bit stream. In an embodiment, a test input may be applied at data input port 128, at an element, at sub-element 204, and/or in between an element and/or sub-element. In an embodiment, test input may be applied to at least a pin located on at least a circuit element. A pin may include extruding terminals on a circuit which may go on to connect to other parts of the circuit. In an embodiment, a pin may connect to the rest of the sub-elements, elements, and wires in a circuit. Each pin located on a circuit may be unique as to its location and function. The first pin located on a circuit may be marked with a notch or dot to signal that it is the first pin. In an embodiment, test input may be applied at a power supply port 136 located on at least a circuit element 124.

In an embodiment, and continuing to refer to FIG. 3, circuit element 124 may include or be communicatively coupled to at least an element with component-specific optical decay patterns such as nitrogen vacancy point defects in diamond or other lattice point defects (e.g. carbide). A nitrogen vacancy (NV) point defect may be considered as a non-limiting representative example of lattice point defects in general. An NV system at room temperature consists of a substitutional nitrogen atom and neighboring vacancy in a carbon lattice. 6 electrons may contribute (2 from nitrogen, 3 from dangling carbon bonds, one captured from lattice; the NV center may be negatively charged with trigonal symmetry; ground ($^3A_2$) and excited ($^3E$) states are spin triplet (S=1) with degenerate $m_s$=+/−1 states. A ground state may exhibit zero-field splitting (Δ=2.87 GHz) due to spin-spin interaction, while excited state separation (Δ=1.42 GHz) is driven by spin-orbit interaction. An excited state spin triplet may in general be non-resolvable. A metastable ($^1A_1$) singlet state has been demonstrated empirically to lie between the excited and ground states. Several have theorized that at least one additional metastable state should exist, but behavior is well described with a single metastable singlet.

Still referring to FIG. 3, at room temperature, ground <–> excited state transitions may occur resonantly at ~637 nm zero phonon line. Radiative decay of electrons from the excited to ground state via metastable singlet state dominate (~70%), with exact quantum yield being spin-dependent. The remainder of excited state electrons undergo phonon-assisted decay. Importantly, these two decay processes occur with differing lifetimes (metastable singlet state lifetime ~10 ns, phonon-assisted decay ~300 ns). Thus, while the system remains coherent, the NV state, and by extension the EM properties of its environment, can be distinguished based on a fluorescence intensity relative to a baseline. This NV state, and similarly over lattice point defects, may be used to establish device-specific fingerprints.

In a representative example, a device may incorporate or be patterned with, have deposited onto it at one or more manufacturing stages, and/or be directly injected with lattice defects, may include subsequent annealing techniques to ensure stability of the vacancy center, through any number of methods known to those skilled in the art. Such point defects are attractive to establish device-specific fingerprints, as they occur with certain probabilities, their precise number, location in XY plane and depth below substrate surface being extraordinarily challenging to pattern or to predict exactly, and their location and number may be measured noninvasively by optical excitation of the defect centers followed by measurement of the decay patterns of the centers via capture of absorption spectra, luminescence, electron paramagnetic resonance (EPR), and/or other techniques known to those skilled in the art. Circuit verifier 104 may apply directly, or may configure elements of circuit element 124 to apply an excitation pulse or series of pulses of energy to the element, and verifier 104 may read directly or may configure elements of circuit element 124 to read the outputs of the defects in the element. Such configurations may further include application of bias magnetic fields which may be static or time-varying fields, may include patterned optical pulses with defined pulse sequences which may vary in optical wavelength, energy, duration, and the like. Such configurations may be predefined for a given set of circuit elements 124 and may be generally known, may be derived from the circuit element 124 so as to require knowledge of extracting the correct test patterns to obtain desired output, such extracting may include at least a decryption step, the determination of decryption algorithm, key and/or passphrase, or other iterative techniques to obtain at least a device specific secret for determining the correct test inputs to validate a particular device or set of devices.

Continuing to refer to FIG. 3, digital inputs may include data or logic inputs, which may be expected by at least a circuit element 124. In an embodiment, a digital input may include a pulse input, which may be made up of a series of digital waveform pulses. A pulse input may be characterized by a rise time, fall time, amplitude, and other characteristics of pulse input. Digital input may also include a sinusoidal input, where the output increases in amplitude with increasing frequency. Digital input may also include a square wave input that may be measured by a percentage title. Tilt may include the decay in the amplitude of the output voltage wave as the input voltage maintains a constant level. Digital input may be sampled by a clock signal at regular intervals by passing signal through a flip-flop. Input may then be measured at specific points in time and the signal from that time may be passed through to the output whereby the output may be held steady until the next clock. In an embodiment, digital inputs may be generated randomly, so as to make it unexpected as to when at least a circuit element 124 may receive a test input. This may also aid in deterring bad actors who attempt to tamper with at least a circuit element, because they will be unable to know at what stage of manufacturing at least a circuit element may be tested, as well as when a digital input may be generated. Input may also be generated by consulting a table that may include information such as a comparison of expected inputs to outputs.

With continued reference to FIG. 3, transmission of test input from circuit verifier 104 to the at least a circuit element 124 may include any form of wired or wireless electronic communication. In general, any network topology may be used. In an embodiment, test input may be sent as a digital signal. Digital signal may include a sequence of codes drawn from a finite set of values. Digital signal may be transmitted physically as a pulse code modulation. In an embodiment, transmission of a waveform as a digital signal may include a clock signal, that may be used to synchronize digital circuits. For example, digital signal may be sampled by a clock signal at regular intervals by passing the signal through an edge sensitive flip-flop. The input may then be measured at those points in time and the signal from that time may be passed through to the output and the output may then be held steady until the next clock. In an embodiment, an analog signal may be transmitted so that the voltage, current, or frequency of the signal may be varied to represent information. Transmission of an analog signal may include electronic noise and distortion which may be overcome by shielding and using cables including coaxial or twisted pair. Distortion may be engineered to encode device or manufacturer/manufacturing lot specific information, in nonlimiting examples by modifying resistance, inductance, and/or capacitance parameters at one or more points along a transmission line.

With continued reference to FIG. 3, at step 315 circuit verifier 104 receives at least a test output from the at least a circuit element 124. At least a test output may comprise any of the outputs as described above in reference to FIG. 1 including data outputs, power consumption, current draw and/or a capacitance reading. In an embodiment, where at least a circuit element 124 includes at least a sub-element, and receiving the expected output may include receiving an output generated by the at least a sub-element. A sub-element may include components that make up elements of a circuit such as voltage sources, current sources, resistors, inductors, and capacitors. In an embodiment, expected output or fingerprint may include aggregated outputs generated by a plurality of sub-elements. In such an instance, expected output of a sub-element may be difficult to calculate and/or capture, and as such expected output of aggregated sub-elements may be utilized. In an embodiment, expected output or fingerprint may include a combination of simulated and actual outputs. For example, as at least a circuit element 124 moves down the manufacturing line or through manufacturing stages, new elements and/or sub-elements may be added onto at least a circuit element 124. As this occurs, expected output or fingerprint may include the combination of expected output previously measured of the already constructed at least a circuit element 124 and expected outcome of the at least a new element. In such an instance, expected output of the at least a circuit element 124 may be added to expected output of new element to establish a new combined expected output also known as fingerprint. Fingerprint may also be generated from a plurality of sub-elements that may include both simulated and actual outputs. In an embodiment, fingerprint may include at least one simulated output of the at least a first sub-element which may be combined with at least an actual output generated by at least a second sub-elements.

With continued reference to FIG. 3, test output may include voltage, current, capacitance, magnetic reading, radio frequency, temperature and/or waveform. In an embodiment, test output may include voltage. Voltage may reflect the electric potential difference in electric potential between two points at least a circuit element 124. Voltage may be measured by devices such as voltmeter, potentiometer, and/or oscilloscope. A voltage reading may represent either a source of energy or lost, used, or stored energy. In an embodiment, voltage test output may be compared to the at least an expected output of at least a circuit element 124. A large difference in measured voltage output versus expected output may indicate the presence of additional equipment and/or devices present on at least a circuit element 124. For example, an expected output may reflect the typical voltage produced by at least a circuit element 124. A test output that indicates a much smaller voltage as compared to expected output may indicate some other device and/or equipment that may be consuming voltage and/or storing energy produced by at least a circuit element 124. In an embodiment, a test output that indicates a much smaller voltage as compared to expected output may also indicate the presence of some other device and/or equipment that is acting as a source of energy to act as an additional source of energy on at least a circuit element 124. In an embodiment, test output consisting of voltage may also indicate the presence of the wrong type of component located on at least a circuit element 124. For example, at least a circuit element 124 may be built to include MOSFETS and transistors that can include a certain maximum gate voltage. A test input such as a pulse can be applied to test for outputs for a different transistor type with for example a higher maximum gate voltage. If the at least a circuit element 124 were to not handle the higher applied voltage and break, that may indicate the at least a circuit element 124 has not been corrupted or tainted with. If for example, at least a circuit element 124 were to not break under such test conditions, then it may indicate that at least a circuit element 124 is not made up of the expected MOSFETS and transistors as expected and may have been tampered with. Test output may also comprise current readings. In an embodiment, at least a circuit element 124 may be connected as a series circuit, whereby at least a circuit element 124 is composed on components such as elements and sub-elements connected in a series. In a series circuit the current through each of the components may be the same and the voltage across the circuit is the sum of the voltages across each component. In an embodiment, current of each component such as an element and/or sub-element may be measured and compared to an expected output current. Test outputs of currents that deviate from expected output may indicate the presence of additional equipment and/or devices present on at least a circuit element 124. For example, test output comprising a measurement of a sub-element in a series element that is higher than expected output may indicate an extra element and/or sub-element that is adding to the greater total voltage across the series circuit. Test output of current may also be measured in a parallel circuit. In a parallel circuit arrangement so long as two or more components, such as elements and/or sub-elements are present, then they will have the same voltage across their ends. The same voltage is applicable to all circuit components connected in parallel. The total current may be equal to the sum of the currents through the individual components.

With continued reference to FIG. 3, test output may include capacitance, the ratio of the change in an electric charge in at least a circuit element 124 to the corresponding change in its electric potential. Capacitance may be measured as mutual capacitance between two adjacent elements and/or sub-elements such as two plates of a capacitor. Capacitance may also be measured as individual capacitance which may include the amount of electric charge that must be added to an isolated element and/or sub-element to raise its electric potential by one unit, such as in an isolated conductor. Test output may also comprise magnetic reading. In an embodiment, at least a circuit element 124 may include elements that produce magnetic flux or respond characteristically to a given magnetic flux, e.g. a nitrogen vacancy defect or other lattice point defect system, for instance as achieved by coating the device in diamond particles or other lattice materials containing such point defects; such elements may or may not be a part of the manufacture design, and in the latter case may indicate tampering or deviation from the design. Such elements may be utilized to channel magnetic fields in devices such as but not limited to electric motors, generators, transformers, relays, SQUIDs, galvanometers, and/or magnetic recording heads. Magnetic reading may be measured by magnetomotive force (MMF). MMF may represent the potential that a hypothetical magnetic charge would gain by completing the loop. MMF may be measured as ampere-turn represented by a steady, direct electric current of one ampere flowing in a single-turn loop of electrically conducting material in a vacuum. MMF may drive magnetic flux through magnetic components such as elements and sub-elements of at least a circuit element 124 comprising a magnetic circuit. The magnetic flux through a magnetic component may be proportional to the number of magnetic field lines that pass through the cross-sectional area of that component. Magnetic flux may be defined by a scalar product of the magnetic field and the area element vector. In an embodiment, magnetic flux may be utilized as a test output to check for potential devices and/or equipment that has been added onto at least a circuit element 124. For example, a test output comprising a magnetic flux and/or MMF reading that is generated from a test input consisting of an electrical input such as a radio frequency signal may indicate the presence of some kind of chip or implant located on at least a circuit element 124. Generally, a test input consisting of an electrical input would not produce a magnetic test output, thereby indicating the presence of some malware that has corrupted at least a circuit element 124. output may also comprise radio frequency, which may include an oscillation rate of an alternating electric current or voltage of a magnetic, electric, or electromagnetic field of at least a circuit element 124. Test output may also include temperature of at least a circuit element 124. Temperature may be measured by a variety of different tools including but not limited to a glass thermometer, thermocouple, thermistor, resistance temperature detector (RTD), pyrometer, Langmuir probe, and/or infrared. In an embodiment, at least a circuit element 124 may include a temperature sensor that may measure test output of temperature. Test output that includes a temperature measurement higher than expected temperature output may indicate the presence of additional devices located on at least a circuit element 124 because by adding a device to at least a circuit element 124 may raise activity of at least a circuit element 124, thereby raising temperature and aging the chip faster. Test output may also include changes in inductance of at least a circuit element. Inductance may include a change in electric current which induces an electromotive force such as voltage in a conductor. Inductance may be caused by a magnetic field of a current-carrying conductor acting back on the conductor. An electric current through a conductor may generate a magnetic field around the conductor. A changing electric current then creates a changing magnetic field. A change in inductance may signify if an additional element has been added onto at least a circuit element 124, such as when there is in increase in inductance, meaning more current is flowing through a conductor and as such generating a larger magnetic field.

With continued reference to FIG. 3, at step 320 circuit verifier 104 compares the at least a test output to the at least an expected output of the fingerprint of the at least a circuit element 124. In an embodiment, comparing may include generating a cryptographic hash of the test output 120 of the at least a circuit element 124 and comparing the cryptographic hash to fingerprint 112 of the at least a circuit element 124. A cryptographic hash, as used herein, is a mathematical representation of a lot of data, such as files or blocks in a block chain as described in further detail below; the mathematical representation is produced by a lossy "one-way" algorithm known as a "hashing algorithm." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 3, cryptographic hash generated of test output 120 may be compared to hash generated of a fingerprint of the at least a circuit element 124. In an embodiment, the cryptographic hash that matches a hash of fingerprint may indicate that at least a circuit element 124 has not been altered; in an embodiment, a cryptographic hash that does not match the fingerprint hash may indicate the presence of tampering with of at least a circuit element 124. In such an instance, at least a circuit element 124 may then be flagged as being suspicious and may not continue to the next manufacturing stage. A cryptographic hash that does not exactly match the fingerprint hash, but which comes close to it may be re-checked. Some level of deviation of test output hash from fingerprint hash may be accepted. Test output may incorporate trap door mechanisms to mitigate extraction of device specific secrets, may include specification of range of stability allowed from the device based on properties of physically unclonable functions if used.

Continuing to refer to FIG. 3, comparing by circuit verifier 104 the at least a test output to the at least an expected output of fingerprint of the at least a circuit element 124 may include comparing fingerprint 112 of the at least a circuit element 124 to a manufacturer specific fingerprint registry. In an embodiment, manufacturer fingerprint registry may include a master list of fingerprints of at least a circuit element 124 produced and manufactured by manufacturer. In an embodiment, this information may be contained on a distributed data structure and/or secure listing. As a second layer of verification, fingerprint may be compared to manufacturer fingerprint registry so as to ensure fingerprint is authentic and belongs to manufacturer. For example, if fingerprint of at least a circuit element 124 is not found contained on manufacturer specific fingerprint registry, then at least a circuit element 124 may be flagged and may need to be further investigated. Fingerprint of at least a circuit element 124 that is found contained on manufacturer specific fingerprint registry may continue on to the next manufacturing stage. Comparison of such fingerprints may utilize remote attestation, direct anonymous attestation (DAA) or anonymous hardware attestation methods in which the device specific fingerprint is attested to via zero knowledge (ZK) proof, interactive or noninteractive ZK proof. Such attestation methods may utilize Camenisch-Lysyanskaya anonymous signatures, mercurial signatures or other delegable signature schemes. Determination of whether a given fingerprint is a genuine fingerprint may utilize whitelists, or alternatively may utilize group key mechanisms attested to via any of the above mechanisms, in which the determination of whether a given fingerprint is genuine amounts to checking membership in a given set, so as to remain anonymous so long as the set is nontrivially small. Such mechanisms may further utilize non-anonymous "blacklists" against which the given fingerprint is compared, or anonymously via proof of non-membership in a set of disallowed devices. Determination of fingerprint membership or non-membership against a whitelist/blacklist may be made anonymous via use of trusted execution environments, multi-party computation approaches, and other mechanisms as known to those skilled in the art.

Continuing to refer to FIG. 3, comparing the at least a test output to the at least an expected output may include comparing the at least a test output of the state of the at least a circuit element 124 to an expected output of the state of the at least a circuit element 124. State of the at least a circuit element 124 may include the state space such as the memory of test inputs and/or outputs applied to and/or produced by at least a circuit element 124. Circuit element 124 may store memory of inputs and/or outputs in electronic memory elements such as flip-flops. The stored contents of these memory elements may contain all the information about the past inputs and/or outputs to which the circuit has access. At least a circuit element 124 may be considered stateless whereby it does not remember the last input and/or output applied and/or generated. At least a circuit element 124 may be considered stateful whereby it does remember the last input and/or output applied and/or generated. In an embodiment, manufacturer may program at least a circuit element 124 to be stateless so that it does not track last inputs and/or outputs, and thus cannot be easily corrupted by malicious actors when it may simply refer to memory as to which input was applied or which output it last produced. Comparing the state of the at least a circuit element may indicate suspicious activity when at least a circuit element 124 is stateful and has been tracking inputs and/or outputs when it has been programed not to be stateful.

With continued reference to FIG. 3, comparing may include comparing at least a test input including a first signal waveform to the at least an expected output or fingerprint including a second signal waveform. In an embodiment, test input may include a first signal waveform, so that comparing by circuit verifier 104 includes comparing the at least a test output 0 waveform to the at least an expected output or fingerprint including a second signal waveform. For example, at least a at least a circuit element 124 may include an analog circuit. The analog circuit when subjected to a test input waveform may produce a test output waveform. Waveform may have certain measurable characteristics including a period, frequency, amplitude, shape, or the like; waveform may have a shape predicted by convolution or other signal-analytic computation, such that an input pulse of a certain width, for instance, may be expected to produce an output signal having a particular form, amplitude, duration, and the like. Circuit verifier 104 may compare test output produced from test input waveform to expected output waveform or fingerprint. In an embodiment, test input may include pulse response so that after test input has been applied, test output pulse response waveform would be compared to expected output pulse response waveform. Where at least a circuit element 124 comprises an analog circuit or where a portion of at least a circuit element 124 is designed to be analog, and has been corrupted by malicious or erroneous party so as to for example add extra equipment of a different manufacturer to analog circuit, including for example an additional analog component or one or more digital elements, test output waveform may be different from expected outcome waveform or fingerprint. Through a process of signal analysis, such as convolution in linear or approximately linear systems, once expected output is known, expected output may be superimposed to compare to other outputs to see what waveforms are produced and how similar the waveforms are; comparison may, e.g., include comparison of an error function representing a difference, such as an average or maximal difference, between expected and received waveforms, which may be compared to a threshold value.

Continuing to refer to FIG. 3, comparing the at least a test output to the at least an expected output may include comparing the at least a test output comprising a component output and comparing to an expected output that comprises a known component located on at least a circuit element. In an embodiment, at least a circuit element 124 may include at least one or more sub-elements that may, for instance, be combined in a manufacturing stage to make up a circuit and/or printed circuit board. In such an instance, a test output may include a component output such as an output measured at a sub-element data port and/or an output measured at a sub-element or may have a predictable effect on output of at least a circuit element 124 as a whole. Component output may then be compared to an expected output of a component; likewise, output of a larger portion of at least a circuit element 124 or of at least a circuit element as a whole may be compared to an expected output based on the expected output of the sub-element. A test output of at least a sub-element that does not match an expected component output may indicate the presence of the wrong component and/or an additional component present on at least a circuit element 124 that is not accounted for. In such an instance, at least a circuit element 124 may be flagged for further investigation. In an embodiment, the manufacturer may be flagged, a user of device containing at least a circuit element 124 may be notified, and/or a specific lot or lots of at least a circuit element 124 may be quarantined for further investigation and testing. Expected output of at least a sub-element may include an output actually measured from at least a sub-element on a previous occasion, such as in a previous stage in manufacturing process; it is worth noting that any method or method step described herein may be repeated at multiple stages of manufacturing, for multiple components of at least a circuit element 124, or the like.

With continued reference to FIG. 3, comparing the at least a test output to the at least an expected output may include performing a statistical comparison of a plurality of test outputs generated based on a plurality of test inputs and comparing to an expected output. In an embodiment, a statistical comparison of a plurality of outputs generated based on a plurality of inputs may be compared to expected outputs to ensure security for testing at one or more manufacturing stages has not been compromised. For example, a random-number generator and/or pseudorandom number generator produces outputs tending to a particular value, this may indicate the random number generator and/or pseudorandom generator is defective or has been tampered with to produce outputs that are not random or pseudorandom, respectively. In an embodiment, such a compromise may undermine the resulting cryptographic material; for instance, if numbers used to generate cryptographic keys are not random as expected, resulting keys may be predictable, and thus insecure, particularly where a party that rigged the random number generator and/or pseudorandom number generator, or that is aware of the rigging, is attempting to break the cryptographic system.

Still viewing FIG. 3, in an embodiment, a plurality of test outputs may be compared to at least an expected output to check for the state of at least a circuit element 124. For example, and without limitation, at least a circuit element 124 that is stateless may not have memory corresponding to the last input, while at least a circuit element 124 that is stateful may remember the last input. A plurality of test outputs may be compared to an expected output to check if the status of at least a circuit element 124 has been manufactured as stateful. In such an instance, this may indicate suspicious activity if at least a circuit element 124 is tracking inputs as a stateful device when it has been designed by a manufacturer, for example, to be stateless. In an embodiment, a plurality of test outputs may be checked against known outputs based on outputs of all pins located on at least a circuit element and/or sub-element and comparing the plurality of test outputs to a table of known outputs.

With continued reference to FIG. 3, comparing may include comparing a test output to the at least a test input of at least a circuit element 124. In an embodiment, a test input may be compared to a test output to ensure test inputs are triggering the current test output. For example, a test input consisting of a current draw that produces a test output consisting of a temperature reading may indicate some type of alteration to at least a circuit element 124 as indicated, for instance, by a change in resistance. In such an instance, a test input consisting of a current draw would expect to produce a test output reflecting some measurement of current draw of at least a circuit element 124 and not a temperature reading. Such a miscommunication may indicate the presence of some additional device and/or element or sub-element that is causing at least a circuit element 124 to produce inaccurate test outputs. In such an embodiment, when test output does not correspond to test input at least a circuit element 124 may then be flagged to be checked for suspicious components.

Figure 5:
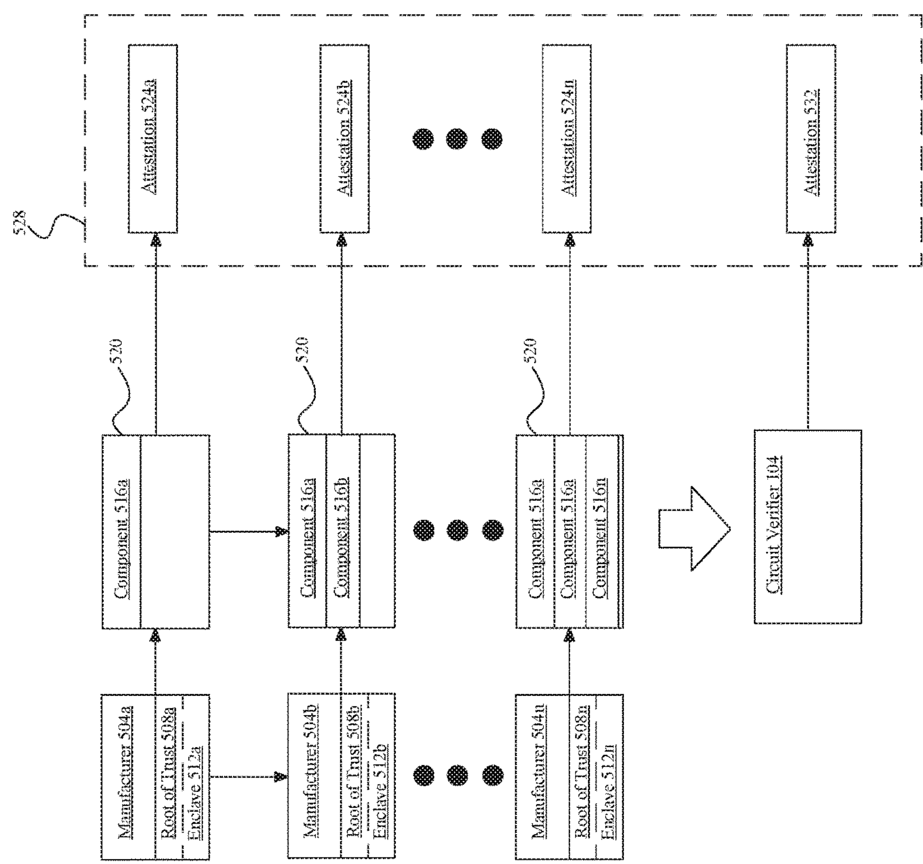
FIG. 5 is a schematic process flow diagram illustrating exemplary embodiments of implementations of disclosed systems and methods.

Turning now to FIG. 5, a schematic process flow diagram illustrates exemplary embodiments of implementation of systems and methods as described above in reference to FIGS. 1-4. A first manufacturer 504*a* may establish a first root of trust 508*a*. First manufacturer 504*a* may include without limitation, an original equipment manufacturer (OEM) as described above; at root of trust one or more device, component, or element-specific secrets may be recorded by the OEM and/or installed and/or fabricated in one or more initially created hardware elements, according to any process and/or using any elements or techniques as described above. First root of trust 508*a* may in turn be incorporated in and/or in communication with an enclave 512*a* as described above. Manufacture of root of trust, enclave, and/or one or more components may be performed, without limitation, as disclosed in U.S. Nonprovisional application Ser. No. 16/506,658, filed on Jul. 9, 2019 and entitled "SECURE COMPUTING HARDWARE APPARATUS AND METHODS OF MANUFACTURING A SECURE COMPUTING HARDWARE APPARATUS," the entirety of which is incorporated by reference herein. Manufacturer 504*a* may create a component 516*a* and/or subcomponent as described above, which manufacturer 504*a* may incorporated in a product 520, partially or wholly made, or may convey to additional manufacturers for incorporation in product One or more personalization steps as described above, such as without limitation measurement of wire bond capacitance upon incorporating silicon die into package to create an additional device-specific signature may be implemented and/or used by one or more "downstream" manufacturers in a device ownership chain, such as a change of manufacturing participants including without limitation silicon fabricators, packaged chip vendors, OEM board vendors, and/or final equipment vendors, to ensure that the chain of history of a device being manufactured is untampered with. First manufacturer 504*a* may generate an attestation 524*a* signing a fingerprint of component 516*a* and/or product 520; attestation may include a hash of a fingerprint of component 516*a* and/or product 520, a digital signature signing such fingerprint and/or hash, or the like. Attestation 524 may be signed using manufacturer-specific key and/or keys, which may be verified by other devices downstream in a product lifecycle. Attestation may be incorporated in a secure listing 528 as described above.

Still referring to FIG. 5, a second manufacturer 504*b* may modify product 520, for instance and without limitation by inclusion of a second component 516*b* in the product 520 and/or by manufacture of the second component 516*b*. Second manufacturer 504*b* may verify first attestation 524*a* and compare it to outputs detected and/or measured according to any process, process step, and/or combination of process and/or process step as described above. Second manufacturer 504*b* may generate, derive, and/or detect a fingerprint of second component 516*b*, second component 516*b* in combination with first component 516*a*, and/or product 520 with both components incorporated, using any processes, process steps, and/or combinations thereof as described above; any of these steps may include generation of a second root of trust 508*b* and/or second enclave 512*b*. Second manufacturer may generate a second attestation 524*b*, which may be incorporated in secure listing 528 and/or an instance thereof. Second attestation 524*b*, which may be generated in any manner suitable for generation of first attestation, may include attestation of a second fingerprint, of evaluation by second manufacturer 514*b* of first fingerprint and/or first attestation 524*a*, and/or any other process and/or step performed by or prior to second manufacturer 504*b*.

In general, and continuing to refer to FIG. 5, one or more downstream manufacturers 504*n* may modify product 520, for instance and without limitation by inclusion of one or more additional components 516*n* in the product 520 and/or by manufacture of the one or more additional components 516*n*. One or more downstream manufacturers 504*n* may verify first attestation 524*a*, second attestation 524*b*, and/or any intervening attestations and compare each or any such attestations to outputs detected and/or measured according to any process, process step, and/or combination of process and/or process step as described above. One or more downstream manufacturers 504*n* may generate, derive, and/or detect a fingerprint of second component 516*n*, second component 516*n* in combination with previously manufactured and/or incorporated components including without limitation first component 516*a*, second component 516*b*, and/or intervening components, and/or product 520 with one or more of such components incorporated, using any processes, process steps, and/or combinations thereof as described above; any of these steps may include generation of a further root of trust 508*n* and/or further enclave 512*n*. One or more downstream manufacturers may generate a one or more further attestations 524*n*, which may be incorporated in secure listing 528 and/or an instance thereof. Further attestations 524*n*, which may be generated in any manner suitable for generation of first attestation, may include attestation of any fingerprint, of evaluation by one or more downstream manufacturers 514*n* of any fingerprint and/or attestation 524*a*, and/or any other process and/or step performed by or prior to a downstream manufacturer 504*n*. In an embodiment, anonymous hardware attestation may allow each participant to assign its credential chain to a particular namespace that it uniquely has access to (for instance, ADI may maintain info about when and where the chip was made and expose only some of this to downstream users.

Further referring to FIG. 5, circuit verifier 104 may perform any verification step described in this disclosure at any stage in the above-described sequence of manufacturing, verification, fingerprint generation, and/or attestation. Circuit verifier 104 may compare attested fingerprints to one or more outputs, for instance as described above in reference to FIGS. 1-4; circuit verifier 104 may evaluate one or more attestations 524*a-n* to determine validity of digital signatures, hashes, or the like, to verify inclusion and/or membership in secure listing 528, to authenticate identities of manufacturers 504*a-n*, or the like. Circuit verifier 104 may generate an attestation 532, which may be generated in any manner suitable for generation of any attestation 524*a-n* described above, attesting to any step performed by circuit verifier 104, including without limitation verification of attestations 524*a-n*, fingerprints, and/or other data and/or processes that may be performed by circuit verifier 104. Attestation 532 may be recorded in secure listing 528. Each attestation 524*a-n*, 532 may be performed using any form of signature and/or attested computing process and/or protocol as described above. Any or all of attestations 524*a-n*, 532 may be timestamped, including without limitation by inclusion of one or more secure timestamps as described above; evaluation and/or verification of attestations may include evaluation and/or verification of timestamps, secure timestamps, digital signatures, hashes, and/or membership in secure listing.

Still referring to FIG. 5, keys, device-specific secrets, and/or personalized information introduced by one or more manufacturers may include keys that are generated by PUFs and/or device-specific secrets created and/or generated by devices operated by manufacturers. Such keys, device-specific secrets, and/or personalized information may be implemented on devices, circuits and/or components being manufactured and/or analyzed as described in this disclosure in the form of any PUF and/or device-specific secret as described above. Such keys, device-specific secrets, and/or personalized information may include shared and/or group keys, secrets, verification data, or the like, for instance as implemented in DAA or similar protocols. At any point in the manufacturing chain it may be desirable to incorporate device-specific features or manufacturing stage specific features into the set of secrets from which keys are derived such that were the device to be compromised via physical key extraction, e.g. "de-capping" in which the lid of the die package or similar feature is removed and the bare integrated circuit is exposed for inspection, or for harvesting for integration into another product, etc. it would be apparent to the user or a verified tester in that the device specific secret would change by the removal or modification process.

Figure 6:
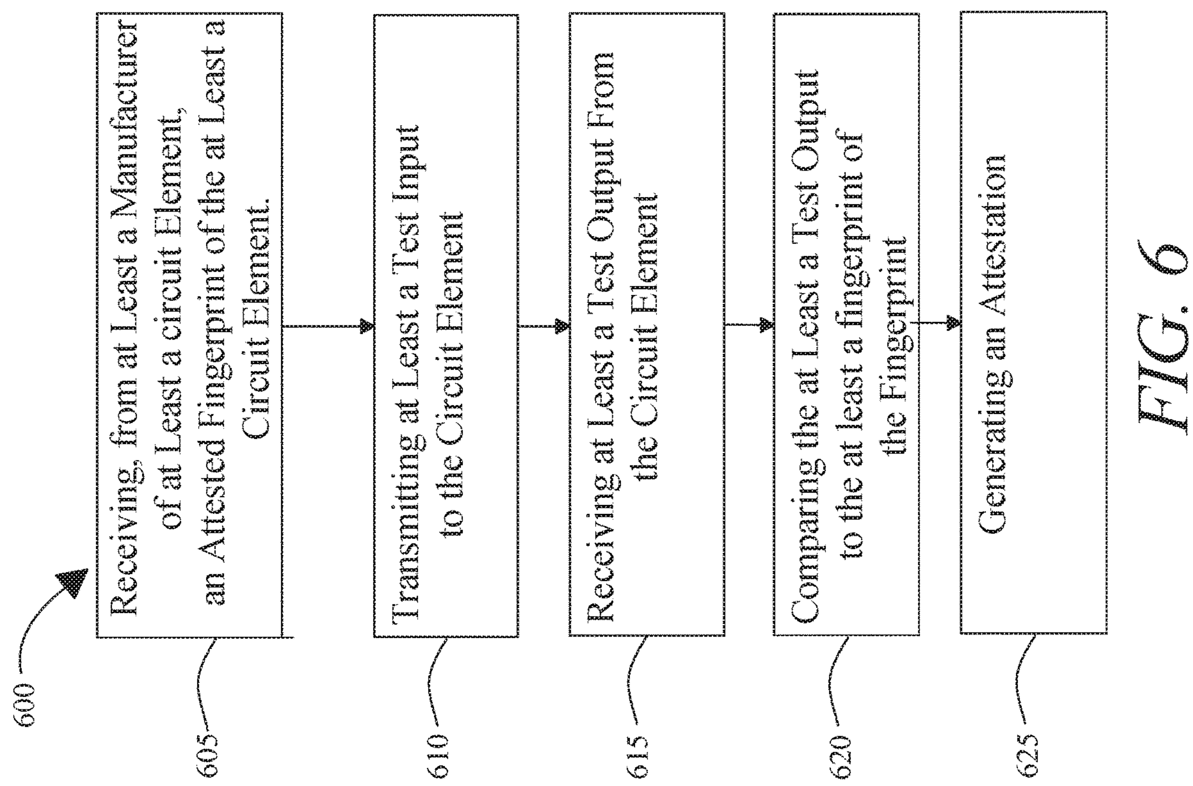
FIG. 6 is an exemplary embodiment of a method for testing circuit elements at one or more stages of manufacturing.

Referring now to FIG. 6, an exemplary embodiment of a method 600 of testing circuit elements at one or more manufacturing stages. At step 605, a circuit verifier 104 receives, from at least a manufacturer of at least a circuit element, an attested fingerprint the circuit element, including at least an expected output corresponding to at least a test input; this may be implemented, without limitation, as disclosed above in reference to FIGS. 1-5. For instance, and without limitation, attested fingerprint may include a digital signature generated by the at least a manufacturer. Receiving fingerprint of the at least a circuit element may include verifying membership of the attested fingerprint in a secure listing. Receiving fingerprint of at least a circuit element may include receiving a physically unclonable function.

At step 610, and still referring to FIG. 6, circuit verifier 104 transmits at least a test input to circuit element; this may be implemented, without limitation, as disclosed above in reference to FIGS. 1-5.

At step 615, receiving, at the circuit verifier 104, at least a test output from the circuit element; this may be implemented, without limitation, as disclosed above in reference to FIGS. 1-5. For instance, and without limitation, circuit element may include at least a sub-element, and receiving the at least test output may include receiving an output generated by the at least a sub-element. Expected output may include a plurality of aggregated outputs generated by a plurality of sub-elements.

At step 620, comparing, by the circuit verifier 104, the at least a test output to the at least an expected output of the fingerprint of the at least a circuit element; this may be implemented, without limitation, as disclosed above in reference to FIGS. 1-5. Comparing may include generating a cryptographic hash of test output of at least a circuit element and comparing the cryptographic hash to the fingerprint of the at least a circuit element. Comparing further comprises comparing the fingerprint of the at least a circuit element to a manufacturer specific fingerprint registry.

At step 625, generating, by the circuit verifier 104, an attestation 532 of a result of the comparing; this may be implemented, without limitation, as disclosed above in reference to FIGS. 1-5. Generating attestation 532 may include digitally signing at least a test output. Circuit verifier 104 may insert attestation 532 into a secure listing. Circuit verifier 104 may add a sub-component to the at least a component.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
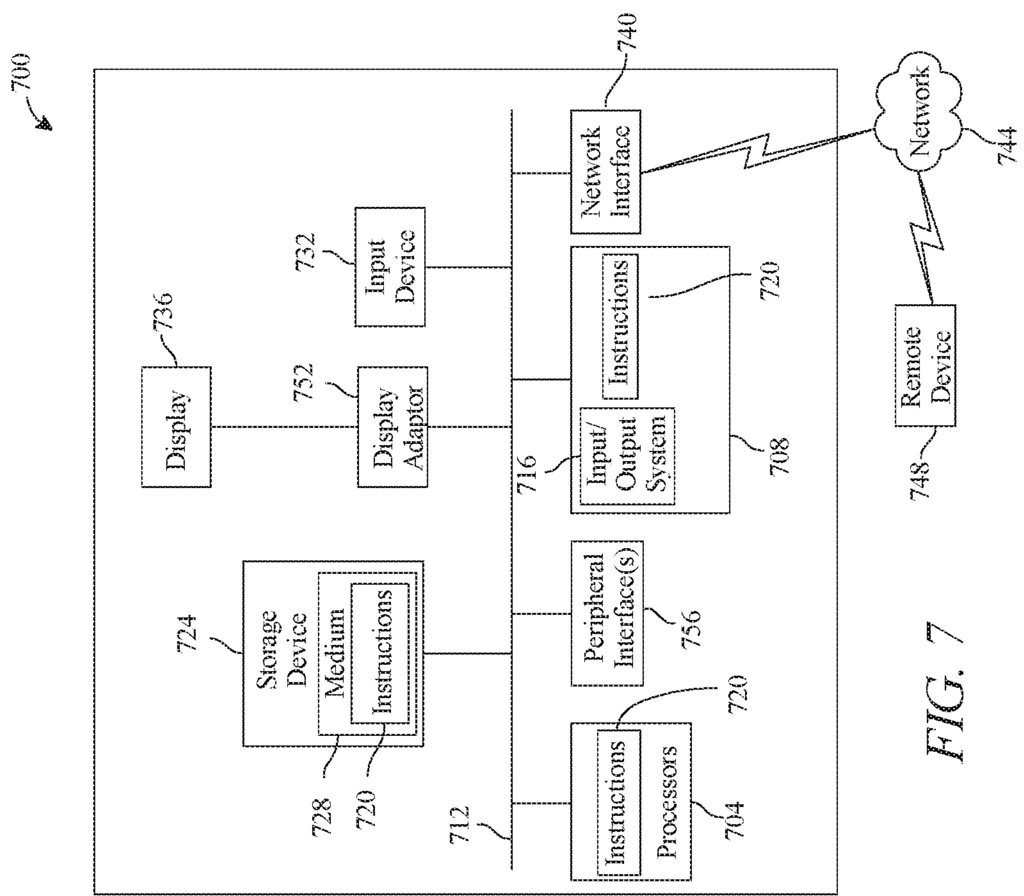
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of testing circuit elements at one or more manufacturing stages, the method comprising:

receiving, at a circuit verifier, from a first manufacturer of a first circuit element, a first attested fingerprint the first circuit element, wherein the first attested fingerprint further comprises a first expected output corresponding to a first test input;

receiving, at the circuit verifier, from a second manufacturer of a second circuit element, a second attested fingerprint of the second circuit element, wherein the second attested fingerprint further comprises a second expected output corresponding to a second test input, wherein the first attested fingerprint is different from the second attested fingerprint, and wherein the second attested fingerprint is generated as a function of the first attested fingerprint;

transmitting, from the circuit verifier, the first test input and the second test input to the first circuit element and the second circuit element, respectively;

receiving, at the circuit verifier, the first test output and the second test output from the first circuit element and the second circuit element, respectively;

comparing, by the circuit verifier, the first test output and the second test output to the first expected output and the second expected output of the fingerprint of the first circuit element and the second circuit element; and generating, by the circuit verifier, an attestation of a result of the comparison.

2. The method of claim 1, wherein the attested fingerprint further comprises a digital signature generated by the first manufacturer.

3. The method of claim 1, wherein receiving the fingerprint of the first circuit element further comprises verifying membership of the first attested fingerprint in a secure listing.

4. The method of claim 1, wherein comparing further comprises:

generating a cryptographic hash of the test output of the first circuit element; and comparing the cryptographic hash to the fingerprint of the first circuit element.

5. The method of claim 1, wherein the first circuit element includes at least a sub-element, and receiving the first test output further comprises receiving an output generated by the at least a sub-element.

6. The method of claim 5, wherein the first expected output further comprises a plurality of aggregated outputs generated by a plurality of sub-elements.

7. The method of claim 1, wherein comparing further comprises comparing the fingerprint of the first circuit element to a manufacturer specific fingerprint registry.

8. The method of claim 1, wherein generating the attestation further comprises digitally signing the first test output and the second test output.

9. The method of claim 1 further comprising inserting the attestation into a secure listing.

10. The method of claim 1 further comprising adding a sub-component to the at least a component.

11. An apparatus for testing circuit elements at one or more manufacturing stages, the apparatus comprising:

a circuit verifier communicatively coupled to a plurality of circuit elements, the circuit verifier designed and configured to:

receive, from a first manufacturer of a first circuit element, a first attested fingerprint the first circuit element, wherein the first attested fingerprint further comprises a first expected output corresponding to a first test input;

receive, at a circuit verifier, from a second manufacturer of a second circuit element, a second attested fingerprint of the second circuit element, wherein the second attested fingerprint further comprises a second expected output corresponding to a second test input, wherein the first attested fingerprint is different from the second attested fingerprint, and wherein the second attested fingerprint is generated as a function of the first attested fingerprint;

transmitting the first test input and the second test input to the first circuit element and the second circuit element, respectively;

receive the first test output and the second test output from the first circuit element and the second circuit element, respectively;

comparing the first test output and the second test output to the first expected output and the second expected output of the fingerprint of the first circuit element and the second circuit element generate an attestation of a result of the comparison.

12. The apparatus of claim 11, wherein the attested fingerprint further comprises a digital signature generated by the first a manufacturer.

13. The apparatus of claim 11, wherein the circuit verifier is further configured to verify the fingerprint of the first circuit element further comprises verifying membership of the first attested fingerprint in a secure listing.

14. The apparatus of claim 11, wherein the circuit verifier is configured to compare the first test output to the first expected output by:

generating, a cryptographic hash of the first test output of the first circuit element; and comparing, the cryptographic hash to the fingerprint of the first circuit element.

15. The apparatus of claim 11, wherein the circuit element includes at least a sub-element, and receiving the first test output further comprises receiving an output generated by the at least a sub-element.

16. The apparatus of claim 15, wherein first expected output further comprises a plurality of aggregated outputs generated by a plurality of sub-elements.

17. The apparatus of claim 11, wherein the circuit verifier is configured to compare the first test output to the first expected output by comparing the fingerprint of the first circuit element to a manufacturer specific fingerprint registry.

18. The apparatus of claim 11, wherein the circuit verifier is configured to generate the attestation by digitally signing the first test output and the second test output.

19. The apparatus of claim 11 the circuit verifier is configured to the insert the attestation into a secure listing.

20. The apparatus of claim 11, wherein the circuit verifier is configured to evaluate a sub-component to add to the at least a component.

* * * * *